(12) United States Patent
Ando et al.

(10) Patent No.: US 9,524,835 B2
(45) Date of Patent: Dec. 20, 2016

(54) INPUT DEVICES AND ELECTRONIC DEVICE USING SAID INPUT DEVICES

(75) Inventors: Hitoshi Ando, Saitama (JP); Noboru Nakafuji, Saitama (JP); Naoyuki Yaguchi, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 611 days.

(21) Appl. No.: 13/060,751

(22) PCT Filed: Aug. 24, 2009

(86) PCT No.: PCT/JP2009/004072
§ 371 (c)(1),
(2), (4) Date: Feb. 25, 2011

(87) PCT Pub. No.: WO2010/023870
PCT Pub. Date: Mar. 4, 2010

(65) Prior Publication Data
US 2011/0157102 A1    Jun. 30, 2011

(30) Foreign Application Priority Data

Aug. 25, 2008 (JP) ................. 2008-215288
Aug. 25, 2008 (JP) ................. 2008-215299
Aug. 25, 2008 (JP) ................. 2008-215306

(51) Int. Cl.
*G06F 3/033* (2013.01)
*H01H 25/04* (2006.01)
(Continued)

(52) U.S. Cl.
CPC .......... *H01H 25/041* (2013.01); *G06F 3/0338* (2013.01); *H04M 1/233* (2013.01);
(Continued)

(58) Field of Classification Search
CPC ........ G06F 3/02; G06F 3/033; G06F 3/03388; H01H 25/041; H01H 19/00; H01H 2205/016; H01H 2221/012; H01H 2225/01; H01H 2025/048; H01H 2201/032; H01H 2203/02; H04M 1/233
(Continued)

(56) References Cited

U.S. PATENT DOCUMENTS 6,313,826 B1 * 11/2001  Schrum et al. ............... 345/161
6,657,560 B1 * 12/2003  Jung ..................... G06F 3/0213
                                                           341/22
(Continued)

FOREIGN PATENT DOCUMENTS

JP    11-126126 A     5/1999
JP    2002-184270 A   6/2002
(Continued)

OTHER PUBLICATIONS

International Search Report for International Application No. PCT/JP2009/004072 mailed Nov. 17, 2009.

*Primary Examiner* — Jimmy H Nguyen
(74) *Attorney, Agent, or Firm* — Cantor Colburn LLP

(57) ABSTRACT

Input device in which a defect of a control disk is eliminated while making use of an advantage of the control disk and an electronic device using the input device. The input device may include: an operation panel, which may be operated by a user; a board, which may be arranged to be opposed to a surface opposite to an operation surface of the operation panel operated by the user; a conductive elastic body and a pusher, which may be fixed on the operation panel; and a sensor portion and a member to be pressed, which may be placed on the board to be opposed to the conductive elastic body and the pusher, respectively.

9 Claims, 20 Drawing Sheets

(51) Int. Cl.
    *G06F 3/0338*  (2013.01)
    *H04M 1/23*   (2006.01)

(52) U.S. Cl.
    CPC . *H01H 2025/048* (2013.01); *H01H 2201/032* (2013.01); *H01H 2203/02* (2013.01); *H01H 2205/016* (2013.01); *H01H 2221/012* (2013.01); *H01H 2225/01* (2013.01)

(58) Field of Classification Search
    USPC .......................................... 345/156–173, 184
    See application file for complete search history.

(56) References Cited

U.S. PATENT DOCUMENTS

| | | | |
|---|---|---|---|
| 6,670,562 B2* | 12/2003 | Kaneko | 200/1 B |
| 6,876,354 B1* | 4/2005 | Terasaki et al. | 345/168 |
| 2009/0058802 A1* | 3/2009 | Orsley | 345/157 |

FOREIGN PATENT DOCUMENTS

| | | |
|---|---|---|
| JP | 2003-500849 A | 1/2003 |
| JP | 2003-99188 A | 4/2003 |
| JP | 2003-174495 A | 6/2003 |
| JP | 2004-86424 A | 3/2004 |
| JP | 2005-93292 A | 4/2005 |
| JP | 2005-166406 A | 6/2005 |
| JP | 2006-179250 A | 7/2006 |
| JP | 2006-309752 A | 11/2006 |
| WO | 00/72333 A1 | 11/2000 |
| WO | 2008/044764 A | 4/2008 |

* cited by examiner

INPUT DEVICES AND ELECTRONIC DEVICE USING SAID INPUT DEVICES

This is a U.S. national stage application of International Application No. PCT/JP2009/004072, filed on 24 Aug. 2009. Priority under 35 U.S.C. §119(a) and 35 U.S.C. §365(b) is claimed from Japanese Application No. JP2008-215288, filed 25 Aug. 2008, Japanese Application No. JP2008-215299, filed 25 Aug. 2008, and Japanese Application No. JP2008-215306, filed 25 Aug. 2008, the disclosure of each of which are also incorporated herein by reference.

TECHNICAL FIELD

The present invention relates to an input device and an electronic device using the input device.

BACKGROUND ART

Conventionally, on an operation portion of audio equipment, a mobile phone, or the like, an input device for inputting numbers or indicating directions is placed. As one kind of the input device, there is known a direction indicator key having a push-button switch structure. In the input device of this kind, as disclosed in, for example, Patent Literature 1 and the like, a lateral direction of a "direction key" corresponds to the lateral direction of a screen of a display section. In other words, for processing represented by icons indicating a left side and a right side of a display screen, operation keys (operation portions) arranged and aligned in the lateral direction are allocated.

However, nowadays, as an electronic device becomes more multifunctional, more operation items are provided. Thus, it is necessary to reliably realize the various operation items. Accordingly, along with a recent improvement of technologies, a touch-panel-type input device has been developed. The touch-panel-type input device reads movement of a finger lightly touching a touch panel, and converts the movement into a signal. Thus, it is unnecessary to strongly press the touch panel by a finger unlike a case of a push-button switch.

Further, in recent years, there is known an input device capable of detecting user's pressing direction and pressing amount using a pressure sensitive member (for example, see Patent Literature 2). Moreover, by making an operation surface of the input device annular, such a control disk is obtained as to allow easy screen shift and the like when a finger continuously touches and slides on the annular operation surface (for example, see Patent Literature 3). The control disk of Patent Literature 3 includes: a control board which is arranged on an inner surface side of a slide key as an operation part and has a pan-shaped inclined surface increasing in diameter toward the slide key around a center axis of the slide key; and a sheet made of an elastic material. In the sheet, a countersink recess for mounting and holding the control board is formed in an upper surface thereof, and an annular protrusion having a cylindrical cross-section is formed on a lower surface thereof correspondingly to a position of a pan-shaped inner peripheral surface of the recess. Through operation of the slide key, the inclined surface situated in the operating direction is pressed by the slide key, and due to the pressing, the pan-shaped inner peripheral surface of the sheet is pressed through the control board. Thus, the protrusion is structured to press the pressure sensitive member arranged below the protrusion.

CITATION LIST

Patent Literature

Patent Literature 1: JP 2003-174495 A (Claims and the like)
Patent Literature 2: JP 2003-500849 A (Claims and the like)
Patent Literature 3: JP 2003-99188 A (Claims and the like)

SUMMARY OF INVENTION

Technical Problem

By the way, a user, who has used an arrow key having the push-button switch structure over the years, sometimes feels uncomfortable when operating the control disk providing no click feeling.

Further, the control disk described in Patent Literature 2 performs processing of calculating a pressing position based on a predetermined calculation expression to determine the pressing position, and hence the control disk is more likely to make an error in determination than the push-button switch which is simply turned ON or OFF.

Further, also in the case of the input device disclosed in Patent Literature 3, due to the pressing, the pressing protrusion made of an elastic material such as a rubber comes into contact with the pressure sensitive member arranged below the pressing protrusion, to thereby perform input operation. Thus, similarly to the above-mentioned touch-panel-type input device, there is a problem that large pressing force is required for deforming the pressing protrusion when an operator performs the input operation, and that operability is not satisfactory.

In view of above, it is an object of the present invention to solve the above-mentioned problem, that is, to provide an input device in which a defect of the control disk is eliminated while making use of an advantage of the control disk, and to provide an electronic device using the input device.

Solution to Problem

In order to achieve the above-mentioned object, according to an aspect of the present invention, there is provided an input device, including: an operation panel, which is operated by a user; a board, which is arranged to be opposed to a surface opposite to an operation surface of the operation panel operated by the user; a conductive elastic body and a pusher, which are fixed on the operation panel; and a sensor portion and a member to be pressed, which are placed on the board to be opposed to the conductive elastic body and the pusher, respectively, in which a center of the conductive elastic body and a center of the pusher do not overlap each other in a radial direction with reference to a center of the operation surface of the operation panel.

Further, it may be preferred that the operation panel have one of a disk shape, an annular shape, and a shape like a part of a circle or a disk in plan view from the operation surface side, that the member to be pressed include at least one belleville-spring member, and be arranged on a first circle concentric with the operation panel, and that the conductive elastic body be arranged on a second circle concentric with the operation panel and having a diameter smaller than a diameter of the first circle.

Further, it may be preferred that the sensor portion include a plurality of sensor portions arranged equiangularly along a circumferential direction, and the conductive elastic body include a plurality of conductive elastic bodies arranged equiangularly along the circumferential direction, that the member to be pressed include a plurality of members to be pressed arranged equiangularly along the circumferential direction, and the pusher include a plurality of pushers arranged equiangularly along the circumferential direction, and that a radial direction extending from the center of the operation surface of the operation panel to a center of the sensor portion and the center of the conductive elastic body do not overlap a radial direction extending from the center of the operation surface of the operation panel to a center of the member to be pressed and the center of the pusher.

Further, it may be preferred that a dimension between the pusher and the member to be pressed be larger than a dimension between the conductive elastic body and the sensor portion.

Further, it may be preferred that the sensor portion include eight sensor portions arranged so that centers thereof are situated at an angle of 45 degrees on a circumference having a diameter of 5 mm or more with reference to the center of the operation surface of the operation panel, and the conductive elastic body include eight conductive elastic bodies arranged so that centers thereof are situated at an angle of 45 degrees on a circumference having a diameter of 5 mm or more with reference to the center of the operation surface of the operation panel, that the member to be pressed include four members to be pressed arranged so that centers thereof are situated at an angle of 90 degrees on a circumference having a diameter of 10 mm or more with reference to the center of the operation surface of the operation panel, and the pusher include four pushers arranged so that centers thereof are situated at an angle of 90 degrees on a circumference having a diameter of 10 mm or more with reference to the center of the operation surface of the operation panel, and that the center of the sensor portion and the center of the member to be pressed closest to the sensor portion be arranged at an angle of 20 to 25 degrees in the circumferential direction with reference to the center of the operation surface.

Further, it may be preferred that the conductive elastic body include a contour member having a hollow formed therein.

Further, it may be preferred that the operation panel include a recess which is recessed at a position on a back side of the conductive elastic body from the surface opposite to the operation surface toward the operation surface.

Further, it may be preferred that the recess have such a shape that a deepest portion having a largest depth dimension is provided closer to a radially outer edge of the recess than a radially inner edge thereof with reference to the center of the operation surface of the operation panel.

Further, it may be preferred that the recess have such a shape that a deepest portion is provided closer to a radially outer edge of the recess than a radially inner edge thereof with reference to the center of the conductive elastic body.

Further, it may be preferred that the recess be formed so that, with reference to the center of the operation surface of the operation panel, an angle between the operation surface and a surface extending from the radially outer edge of the recess to the deepest portion is larger than an angle between the operation surface and a surface extending from the radially inner edge of the recess to the deepest portion.

Further, it may be preferred that the center of the conductive elastic body be arranged on a circumference of the second circle, and that the deepest portion of the recess be formed on a circumference of a third circle concentric with the operation surface of the operation panel and situated outward of the second circle.

Further, it may be preferred that the conductive elastic body be made of a conductive rubber.

Further, according to an aspect of the present invention, there is provided another input device, including: an operation panel, which is operated by a user; a board, which is arranged to be opposed to a surface opposite to an operation surface of the operation panel operated by the user; a conductive elastic body, which is fixed on the operation panel; and a sensor portion, which is placed on the board to be opposed to the conductive elastic body, in which the operation panel includes a recess which is recessed from the surface opposite to the operation surface toward the operation surface at a position at which the conductive elastic body is to be arranged.

Further, according to another aspect of the present invention, there is provided an electronic device, including: the input device according to any one of the inventions described above; a determination section for determining a content of operation based on a signal from the input device; an execution section for executing the content of operation based on determination of the determination section; and a display section for displaying a content to be executed.

Advantageous Effects of Invention

According to the present invention, it is thus possible to provide the input device in which the defect of the control disk is eliminated while making use of the advantage of the control disk.

Figure 1:
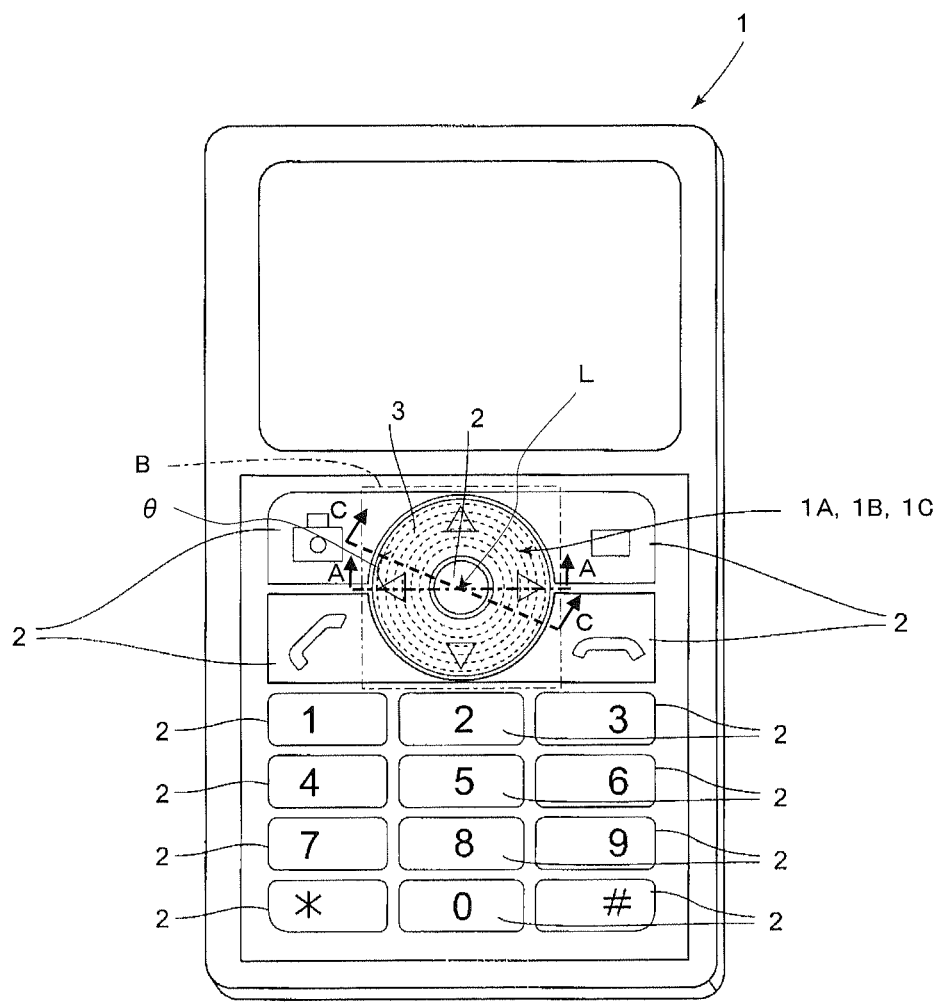
FIG. 1 A perspective view of an electronic device according to each embodiment of the present invention when viewed from a front side.

DESCRIPTION OF SYMBOLS 1 electronic device
1A, 1B, 1C input device
3 operation panel
5, 5a, 5b pusher (pushing member)
6 conductive elastic body
7 first circle
8 second circle
10, 10a, 10b member to be pressed
11 sensor portion
12 board
13 fixed contact point (part of member to be pressed)
14 belleville-spring member (part of member to be pressed)
15 conductive portion (part of member to be pressed)
50 convex body (conductive elastic body)
60 recess
61 deepest portion
62 edge portion
L center
α dimension between conductive elastic body and sensor portion
β dimension between pusher and member to be pressed

DESCRIPTION OF EMBODIMENTS

In the following, preferred embodiments for carrying out the present invention are described with reference to the drawings. However, the present invention is not limited to the following embodiments.

First Embodiment

First, an electronic device and an input device according to a first embodiment of the present invention are described. FIG. 1 is a perspective view of an electronic device 1 according to the first embodiment when viewed from an operation surface side.

The electronic device 1 includes an input device 1A, a determination section for performing determination based on a signal from the input device 1A, an execution section for executing a content of operation based on the determination of the determination section, and a display section for displaying the executed content. A user operates an operation panel 3 of the input device 1A and key tops 2 serving as push-button switches arranged on the operation surface of the electronic device 1, to thereby be able to operate the electronic device 1. In the input device 1A, the operation panel 3 has an annular shape in plan view from the operation surface side, and the key top 2 is arranged in an inner portion surrounded by the annular operation panel 3.

Figure 2:
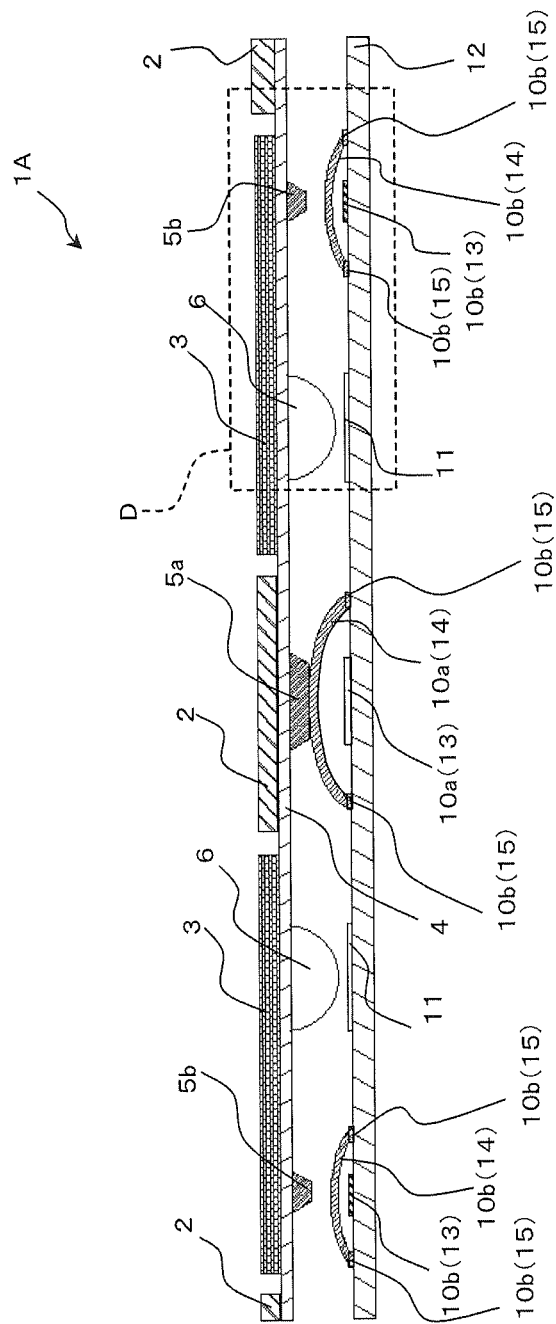
FIG. 2 An enlarged sectional view of a cross-section taken along the line A-A of FIG. 1.
Figure 3:
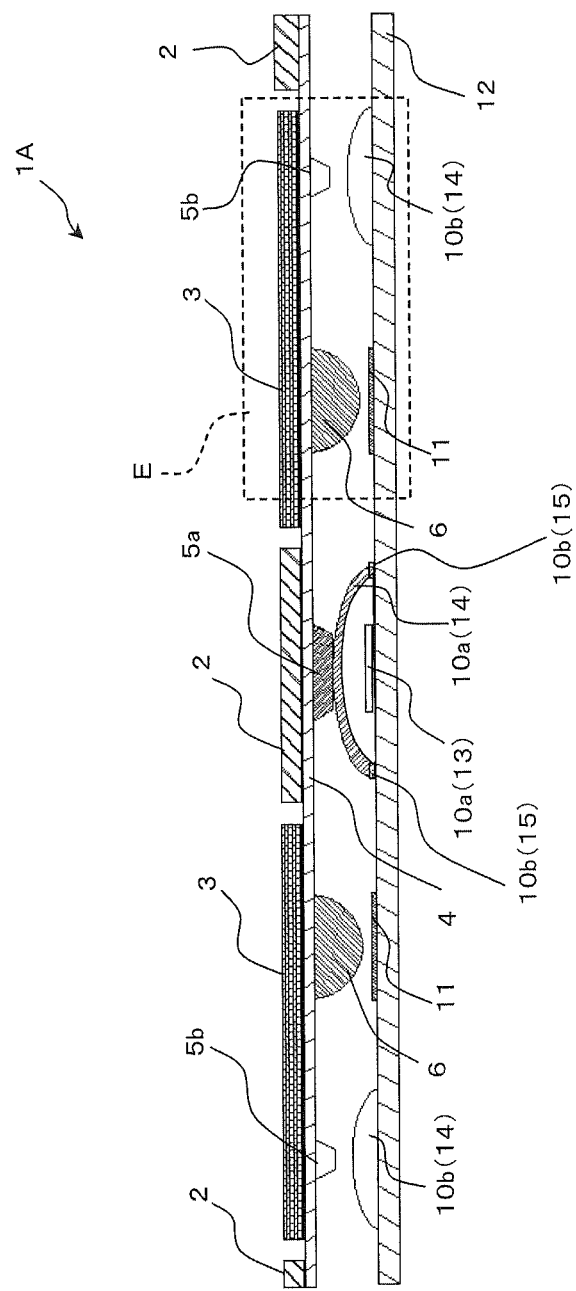
FIG. 3 An enlarged sectional view of a cross-section taken along the line C-C of FIG. 1.

FIG. 2 is an enlarged sectional view of the input device 1A according to this embodiment taken along the line A-A of FIG. 1, which illustrates the cross-section as viewed in a direction of arrows of the line A-A in an enlarged manner. FIG. 3 is an enlarged sectional view of a cross-section taken along the line C-C forming an angle θ of 22.5° with the line A-A of FIG. 1, which illustrates the cross-section as viewed in a direction of arrows of the line C-C in an enlarged manner.

The input device 1A mainly includes the key tops 2, the operation panel 3, an elastic sheet 4, pushers 5, conductive elastic bodies 6, members to be pressed 10, sensor portions 11, and a board 12.

The key tops 2 and the operation panel 3 are operation portions for a user to operate the input device 1A by pressing and the like. Each of the key top 2 and the operation panel 3 is a member made of a resin, a metal, or a composite material of the resin and the metal, and may be a single product or a product formed of a plurality of layers. When adopting the key tops 2 and the operation panel 3 formed of the plurality of layers, it is preferred that each of the key top 2 and the operation panel 3 be a member having a surface covered with a resin sheet, and the surface may be covered partially or entirely. As materials for the key tops 2 and the operation panel 3 according to this embodiment, which are made of a resin, there can be used various resins, such as a polycarbonate resin, an acrylic resin, an acrylonitrile-butadiene-styrene copolymer resin, a polypropylene resin, a vinyl chloride resin, a polystyrene resin, a methacrylic resin, a polysulfone resin, a polyester resin, and a polyamide resin. As particularly preferred resins, the polycarbonate resin and the acrylic resin may be given.

As the operation panel 3, for example, an operation panel having an operation surface as an annular flat surface can be used. For example, it is possible to use the annular operation panel 3 having a thickness of about 1 mm and a flat surface portion which has a diameter of an outer circumference of about 20 mm and a diameter of an inner circumference of about 7 mm. Further, in order for a user to easily glide a finger on the operation panel 3 like drawing a circle, for example, grooves to be arranged coaxially at intervals of 0.2 mm in a radial direction may be formed in the operation panel 3. Further, in order for a user to recognize a position of the operation panel 3 by finger touch, a thickness of an outer peripheral portion of the operation panel 3 may be made larger than that of a portion other than the outer periphery, that is, an annular edge may be formed.

On the opposite side of the operation surfaces of the key top 2 and the operation panel 3 (hereinafter, the operation surface side is referred to as a front surface, and the opposite surface side is referred to as a back surface), the elastic sheet 4 is pasted. Specifically, the key top 2 and the operation panel 3 are bonded onto the elastic sheet 4 through adhesive layers (not shown) provided on back surface portions of the key top 2 and the operation panel 3.

It is preferred that, as a material for the elastic sheet 4, there be used a material soft enough to be easily deformed when being pressed by a finger from the front surface side. Specifically, the elastic sheet 4 having a thickness of about 10 μm to about 200 μm and a shore A hardness of 20 to 90 is particularly preferred. As the elastic sheet 4 described above, for example, there may be given a sheet made of a urethane resin, a thermoplastic elastomer, a silicone rubber, or a natural rubber. It is more preferred to use a sheet made of, of those materials, a urethane-based elastomer having high durability. In addition, the elastic sheet 4 may be decorated. Further, the elastic sheet 4 may have a light transmittance high enough to allow substantial transmission of visible light. When adopting the elastic sheet 4 having the high light transmittance, it is possible to illuminate the key tops 2, the outer periphery of the operation panel 3, and vicinities thereof by illuminating from the back side of the elastic sheet 4. Thus, positions of the key tops 2 and the operation panel 3 are easily recognized even in the dark.

Further, on the back surface of the elastic sheet 4, i.e., on the back surfaces of the key tops 2 and the back surface portion of the operation panel 3, the pushers 5 and the conductive elastic bodies 6 protruding from the elastic sheet 4 are formed. Hereinafter, the pushers 5 provided on the back surface portions of the key tops 2 are referred to as pushers 5a. Further, the pushers 5 provided on the back surface portion of the operation panel 3 are referred to as pushers 5b. Further, the pushers 5 refer to both the pushers 5a and the pushers 5b.

Figure 4:
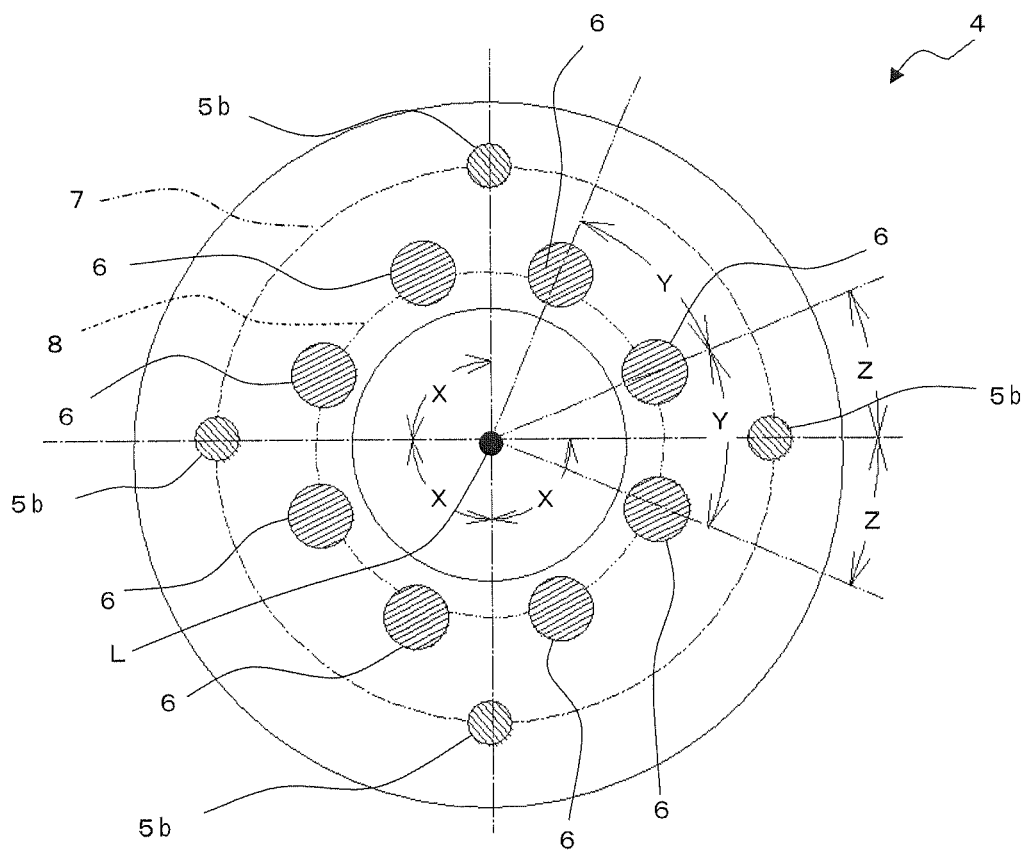
FIG. 4 A plan view of an elastic sheet overlapping an operation panel in the region B of FIG. 1 when viewed from a back surface side.

FIG. 4 is a plan view of the back side portion of the operation panel 3 when viewed from the back surface side of the elastic sheet 4.

The pushers 5 protrude from the back surface of the elastic sheet 4, i.e., from the back surface portions of the key tops 2 and the operation panel 3. The pushers 5 may be formed on the elastic sheet 4 by integrally molding the pushers 5 and the elastic sheet 4. Alternatively, the pushers 5 may be fixed on the elastic sheet 4 with an adhesive, etc. When the operation panel 3 is pressed from the front surface side, each of the pushers 5 can cause a fixed contact point 13 and a belleville-spring member 14 covering the fixed contact point 13 to come into contact with each other.

Meanwhile, the plurality of pushers 5b are arranged so that centers thereof are on a circumference of a first circle 7 with reference to a center L of the operation panel 3. For example, the centers of the pushers 5b, which are adjacent to each other on the circumference of the first circle 7, are arranged at an angle X in a circumferential direction on the first circle 7 having a diameter of about 16 mm. In the input device 1A, the adjacent pushers 5b form an angle of 90 degrees on the circumference of the first circle 7, and four pushers are provided in total.

Each of the conductive elastic bodies 6 is a conductive elastic body having a hemispherical shape and a diameter of 2.5 mm, which protrudes from the elastic sheet 4 toward the sensor portion 11. When the diameter of the hemispherical conductive elastic body 6 is 2 mm or more, a resistance value does not vary suddenly against pressing, which is preferred. Further, it is preferred that a distance by which the conductive elastic body 6 protrudes from the elastic sheet 4 (hereinafter, referred to as height of the conductive elastic body 6) be larger than a movable range of the belleville-spring member 14 described below. It is preferred that, as the conductive elastic body 6, there be used such an elastic body as to be easily deformed when a finger touches the front surface of the operation panel 3, for example, a rubber or an elastomer containing a carbon material and the like and having a shore hardness of about 50 degrees to 90 degrees. In a case where the conductive elastic body 6 having the shore hardness of 50 degrees to 90 degrees is used, when a user glides a finger on the operation panel 3, the operation panel 3 is not excessively depressed, and in addition, a pressure generated by glide of a finger of a user on the operation panel 3 can be detected by the sensor portion 11.

When the elastic sheet 4, the pushers 5b, and the conductive elastic bodies 6 are viewed from the back surface side of the elastic sheet 4, the plurality of conductive elastic bodies 6 are arranged in the circumferential direction so that centers thereof are on a second circle 8 having a diameter of about 10 mm with reference to the center L of the operation panel 3. For example, the centers of the conductive elastic bodies 6, which are adjacent to each other in the circumferential direction of the second circle 8, are arranged at an angle Y (see FIG. 4). In this embodiment, the conductive elastic bodies 6, which are adjacent to each other in the circumferential direction, form an angle of 45 degrees on a circumference of the second circle 8, and eight conductive elastic bodies are provided in total. Note that, the above-mentioned angle X and the angle Y may be equal or different.

Figure 5:
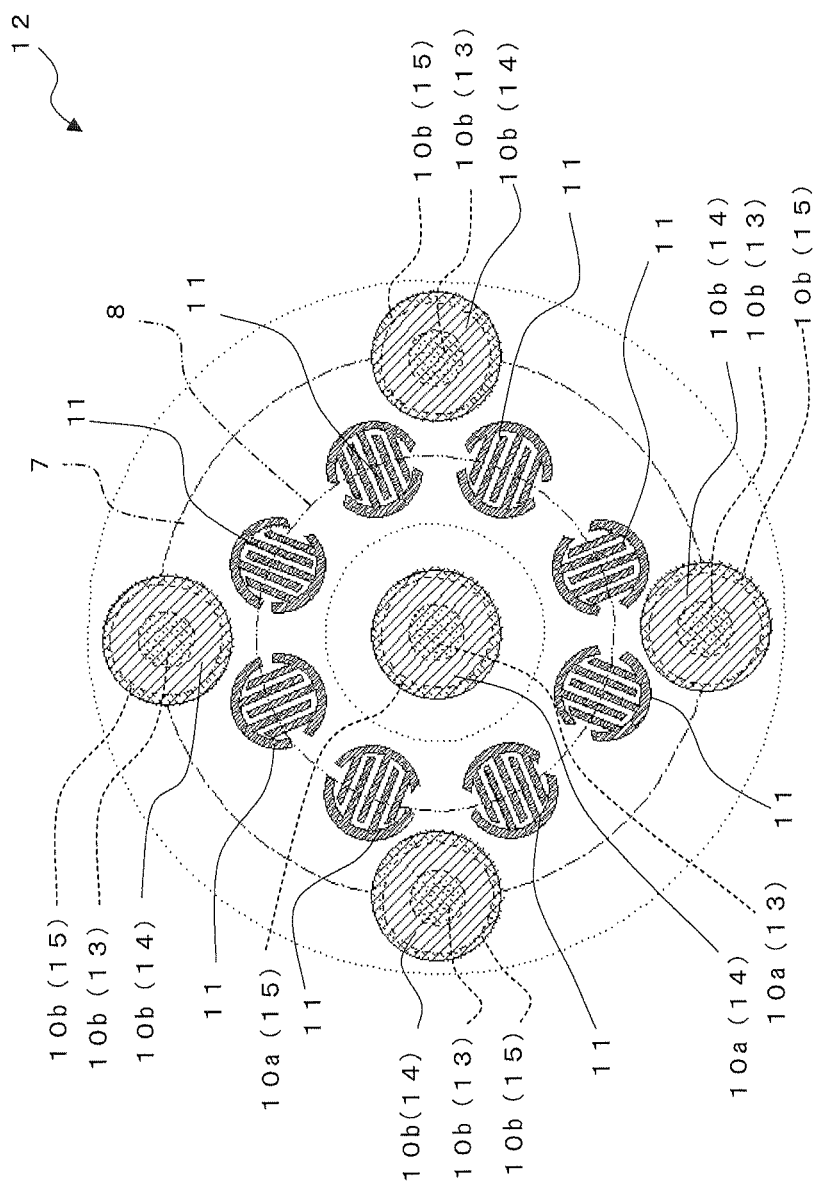
FIG. 5 A plan view of a board in the region B of FIG. 1 when viewed from the front side.

FIG. 5 is a plan view of the board 12 as viewed from the front side in the region B indicated by the chain line of FIG. 1, and is a transparent view of the belleville-spring members 14 covering the fixed contact points 13.

The board 12 is provided on the back surface side of the operation panel 3 to be opposed to the elastic sheet 4. On a surface of the board 12 opposed to the elastic sheet 4, the sensor portions 11, and the fixed contact points 13 and the belleville-spring members 14 covering the fixed contact points 13, which serve as the members to be pressed 10, are provided.

The members to be pressed 10 are provided at positions opposed to the back surface of the annular operation panel 3, and at positions opposed to the key top 2 which is arranged in the center portion of the operation panel 3. Hereinafter, the members to be pressed 10 arranged in a region opposed to the back surface of the key top 2 are referred to as members to be pressed 10a. Further, the members to be pressed 10 arranged in a region opposed to the back surface of the operation panel 3 are referred to as members to be pressed 10b. Further, the members to be pressed 10 refer to both the members to be pressed 10a and the members to be pressed 10b. Further, the members to be pressed 10 include the fixed contact points 13, the belleville-spring members 14, and conductive portions 15 arranged on the board 12 side.

The members to be pressed 10 is provided to be opposed to the pusher 5. Further, under a state in which no pressing force is applied to the operation panel 3, the member to be pressed 10 and the pusher 5 are separated from each other by a distance β in a pressing direction. The member to be pressed 10b is provided to be opposed to the pusher 5b, and hence the center of the member to be pressed 10b is arranged on the first circle 7.

The belleville-spring member 14, the fixed contact point 13, and the conductive portion 15 included in the member to be pressed 10 are conductive portions provided on the board 12. Specifically, using conductive bodies such as copper foil, the belleville-spring member 14, the fixed contact point 13, and the conductive portion 15 are formed on the board 12 impregnated with an insulating resin.

The belleville-spring member 14 included in the member to be pressed 10 has a dome shape, and an outer edge thereof is connected to the conductive portion 15, to thereby cover the fixed contact point 13. The belleville-spring member 14 functions as a movable contact point for connecting/disconnecting the fixed contact point 13 and the conductive portion 15 to/from each other. The belleville-spring member 14 in this embodiment is mainly made of, for example, stainless steel, and has a thickness of about 0.040 to 0.070 mm and a diameter of 4 mm to 5 mm. Further, the movable range of the belleville-spring member 14 in this embodiment, i.e., a range where a dome top of the belleville-spring member 14 can be displaced when the belleville-spring member 14 is pressed with a load of 1.0 to 3.0 N in a direction opposite to the protruding direction falls within 0.10 to 0.25 mm. However, a material for the belleville-spring member 14 is not limited to a metal, and the belleville-spring member 14 may be formed of a polyester dome obtained by performing conductive printing on a polyethylene terephthalate (PET) resin molded into an inverted cup shape, a conductive resin, or the like. Further, for example, the elliptic belleville-spring member 14 having a short side of 3 mm and a long side of 4 mm or the like may be used. Note that, when the belleville-spring member 14 is made of a metal, click feeling is more easily generated when compared with a case of being made of other materials, and hence it is possible to obtain satisfactory operation feeling.

In the member to be pressed 10 configured as described above, the key top 2 or the operation panel 3 is depressed, the pusher 5 presses the belleville-spring member 14. The belleville-spring member 14 is buckled by the pressing force (normally, of about 1.0 to 3.0 N). Through the buckled belleville-spring member 14, the fixed contact point 13 and the conductive portion 15 are electrically connected to each other, and thus the fixed contact point 13 is brought into a conduction state. When depression of the key top 2 or the operation panel 3 is released, the belleville-spring member 14 is restored. In this way, the fixed contact point 13 and the conductive portion 15 connected to each other through the belleville-spring member 14 are disconnected from each other, and thus the fixed contact point 13 is brought into a non-conduction state.

Similarly to the fixed contact point 13, the sensor portion 11 is a conductive portion formed on the board 12. Further, as illustrated in a plan view of FIG. 5, the sensor portion 11 is formed within substantially the same diameter as a diameter of the conductive elastic body 6 so that a pair of comb-teeth-like electrodes are in a non-contact meshing state. Further, the sensor portion 11 is provided so as to be opposed to the conductive elastic body 6 at a distance α therefrom. Regarding the sensor portions 11, when a finger touches the operation panel 3, one or a plurality of conductive elastic bodies 6 on the back side of the touched portion are depressed, and thus the one or the plurality of conductive elastic bodies 6 touch one or a plurality of sensor portions 11. Then, a short circuit occurs between electrodes of each sensor portion 11 through the conductive elastic body 6. When the conductive elastic body 6 is further pressed, a contact area between the conductive elastic body 6 and the sensor portion 11 increases. A change in voltage value, current value, or resistance value caused by a change in contact area of the one or the plurality of sensor portions 11 is measured by a central processing unit (not shown) as the determination section provided in the input device 1A. In this way, the input device 1A can grasp a pressing intensity and a direction that a finger touches.

Further, in this embodiment, it is preferred that, in a radial direction, the centers of the conductive elastic bodies 6 or the centers of the sensor portions 11 provided on the second circle 8 do not overlap the centers of the pushers 5b or the centers of the members to be pressed 10b provided on the first circle 7. For example, the center of each of the conductive elastic bodies 6 is provided to form an angle Z of 22.5 degrees in the circumferential direction (see FIG. 4: angle between the center of each of the conductive elastic bodies 6 and the center of each of the members to be pressed 10b) with the member to be pressed 10b closest in the circumferential direction with reference to the operation center L of the operation panel 3. The conductive elastic bodies 6 are arranged at such positions, and hence, when depressing the operation panel 3, the conductive elastic bodies 6 are less likely to interfere. Thus, a user easily depresses the members to be pressed 10b at the outer periphery of the operation panel 3. Therefore, the input device 1A can function as an annular control disk, and operate as a direction indicator key having a push-button function. Further, the input device 1A is less likely to malfunction, accurate as a control disk, and easy to operate as the push-button switch. In addition, when operating as the push-button switch, the input device 1A provides better click feeling.

In this embodiment, it is preferred that the first circle 7 be larger in diameter than the second circle 8, that is, the first circle 7 be provided outward of the second circle 8. The reason is as follows. In a case where a circular or annular arrow key is provided, a user tends to press an outermost peripheral side in an indicating direction of the key, and hence it is preferred that the members to be pressed 10b that require a larger pressing force be provided on the outer peripheral side. However, in a case where a diameter of the operation panel 3 is 18 mm or less, it is preferred that the first circle 7 and the second circle 8 have the same arc. This is because the operation panel 3 with a diameter of 18 mm or less has a small circumference, and hence a user tends to draw an arc using the outer peripheral side of the operation panel 3. When the members to be pressed 10b are provided on portions that are easy to press, the pushers 5b can press the members to be pressed 10b from just above the members to be pressed 10b, and hence it is possible to precisely turn the switch ON or OFF.

Figure 6:
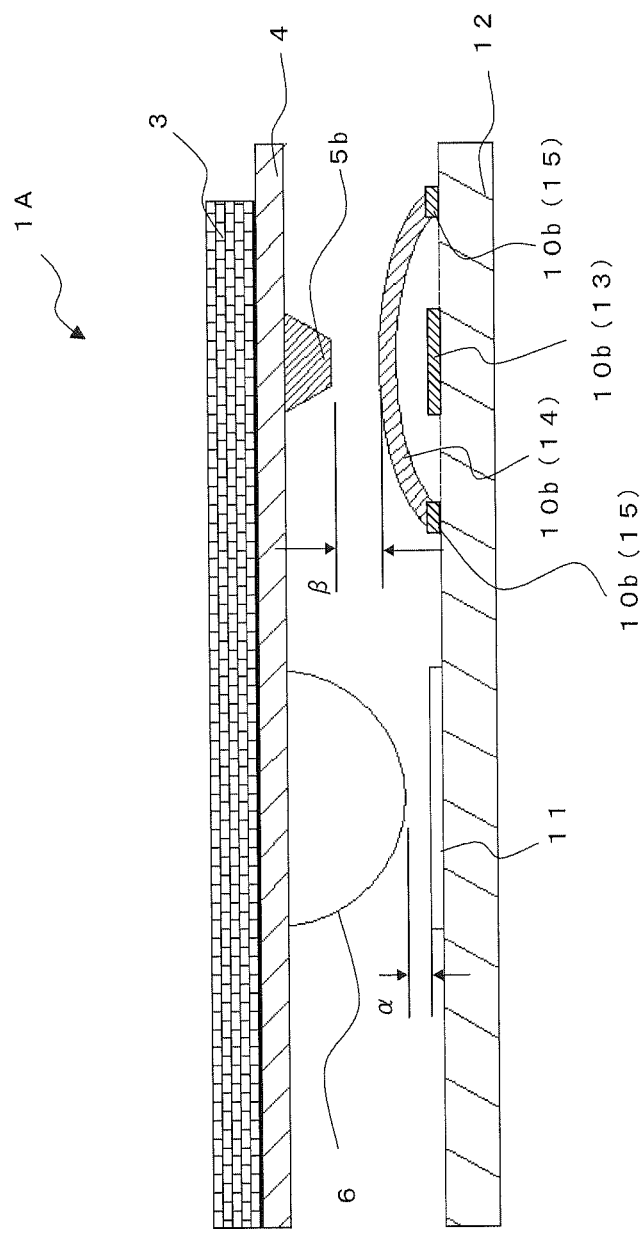
FIG. 6 An enlarged sectional view of a cross-section in the region D of FIG. 2.
Figure 7:
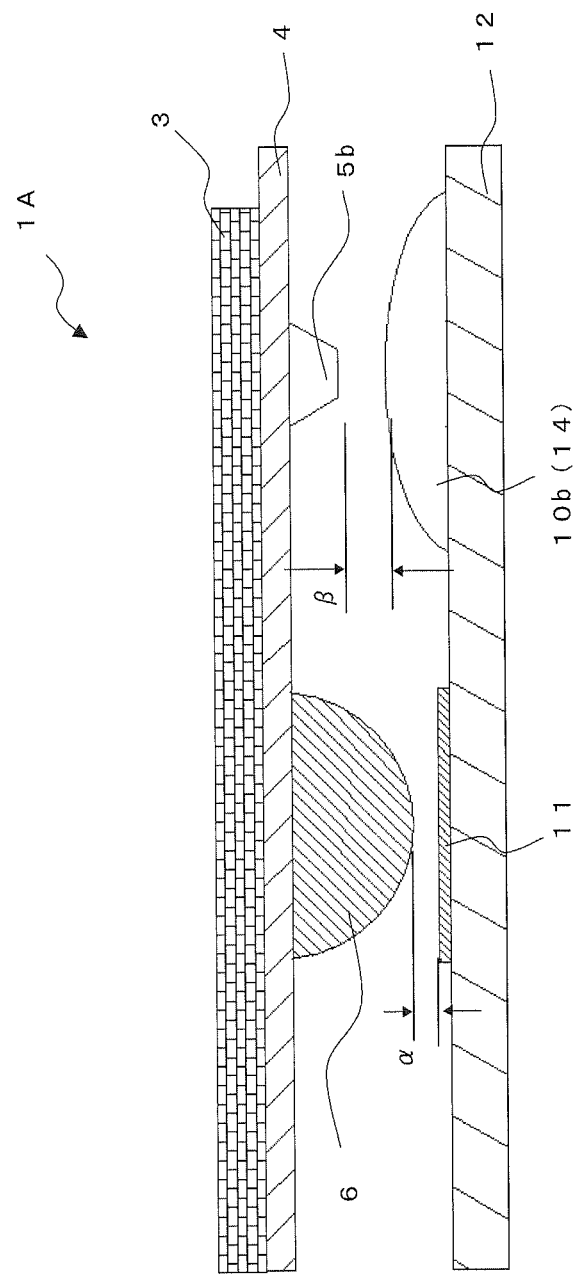
FIG. 7 An enlarged sectional view of a cross-section in the region E of FIG. 3.

FIG. 6 is an enlarged sectional view of a region D indicated by the broken line of FIG. 2. Further, FIG. 7 is an enlarged sectional view of a region E indicated by the broken line of FIG. 3.

Under a state in which a finger does not touch the operation panel 3, a separation distance β between the pusher 5b and the belleville-spring member 14 is larger than the separation distance α between the conductive elastic body 6 and the sensor portion 11. In this embodiment, the distance β is, for example, 0.2 to 0.35 mm, and the distance α is 0.2 to 0.3 mm. The distance β is larger than the distance α, and hence, when a finger touches the operation panel 3, the conductive elastic body 6 first touches the board 12, to thereby allow the operation panel 3 to start to function as a control disk. Further, under a state in which a finger touches the operation panel 3 lightly, the member to be pressed 10$b$ is easily kept in an OFF state, and hence it is possible to obtain the input device 1A in which the member to be pressed 10$b$ is less likely to malfunction. That is, only when the operation panel 3 is depressed more strongly, the member to be pressed 10$b$ is pressed.

As described above, the input device 1A according to the embodiment of the present invention functions as a control disk for reading movement of a finger touching the operation panel 3 lightly, and allows arrangement of a push-button function at the outer periphery of the operation panel 3. That is, it is possible to provide push-button switches capable of providing click feeling while having an advantage of an annular control disk, and the push-button switches are used as direction indicator keys, to thereby enable input in four directions (up, down, right, and left directions).

Further, an interval (distance 3) between the pusher 5 and the member to be pressed 10 is larger than an interval (distance $\alpha$) between the conductive elastic body 6 and the sensor portion 11, and hence input to the sensor portion 11 is prior to input to the member to be pressed 10, which takes the advantage of the control disk. Meanwhile, when touching lightly as the control disk, the member to be pressed 10$b$ is kept in the OFF state, and hence it is possible to obtain the input device 1A in which the member to be pressed 10$b$ is less likely to malfunction.

In addition, the center of the conductive elastic body 6 does not overlap the center of the member to be pressed 10$b$ in the radial direction, and hence the conductive elastic body 6 and the member to be pressed 10$b$ can be arranged on the board 12 in a space-efficient manner. Thus, it is possible to reduce a size of the input device 1A.

Figure 8:
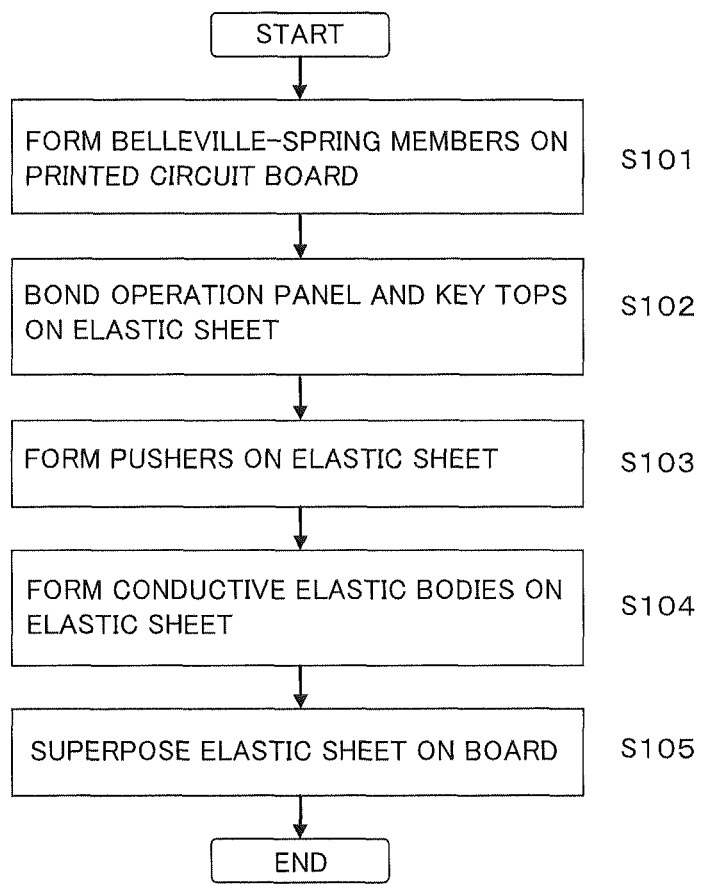
FIG. 8 A flowchart illustrating processes of manufacturing an input device according to a first embodiment.

Next, a method of manufacturing the input device 1A according to this embodiment is described. FIG. 8 is a flowchart illustrating processes of manufacturing the input device 1A according to this embodiment.

First, the board 12 including the sensor portions 11, the fixed contact points 13, and the conductive portions 15 formed thereon is prepared, and the belleville-spring members 14 are arranged on the board 12 (Step S101). In Step S101, the board 12 provided with predetermined wiring including the sensor portions 11, the fixed contact points 13, and the conductive portions 15 is prepared. On the printed circuit board, the belleville-spring members 14 are arranged. Under a state in which the belleville-spring members 14 are arranged, an adhesive sheet (not shown) adheres to the board 12 so as to cover the belleville-spring members 14, and thus the belleville-spring members 14 are suitably fixed.

Further, while the belleville-spring members 14 are arranged on the board 12, or before or after the belleville-spring members 14 are arranged, the operation panel 3 and the key tops 2 are pasted on one surface of the elastic sheet 4 by the adhesive in another process (Step S102). Then, the pushers 5 are pasted on the back surface of the elastic sheet 4 by the adhesive (Step S103). Then, the conductive elastic bodies 6 are applied by the adhesive to be pasted on the back side portion of the elastic sheet 4 corresponding to the portion onto which the operation panel 3 is pasted (Step S104). Then, the elastic sheet 4 is superposed on the board 12 prepared in Step S101, and is placed in a casing of the electronic device 1 (Step S105).

Note that, the operation panel 3 and the key tops 2 may be bonded onto the elastic sheet 4 by the adhesive, or may be bonded onto the elastic sheet 4 through an adhesive layer such as a double-coated tape or by thermal fusion bonding or the like. Further, Steps S101 to S104 do not have to be performed in the above-mentioned order. For example, Steps S101 to S104 may be performed in the reverse order, or any one of Step S102 to Step S104 may be performed first. That is, the order of Steps may be appropriately changed.

Second Embodiment

Next, the electronic device 1 and an input device 1B according to a second embodiment of the present invention are described. In the second embodiment, components common to those of the first embodiment are denoted by the same reference symbols, and description of the common components is omitted. Note that, in this embodiment, in FIG. 1, the input device 1B having a configuration different from that of the input device 1A of the first embodiment is employed.

Figure 9:
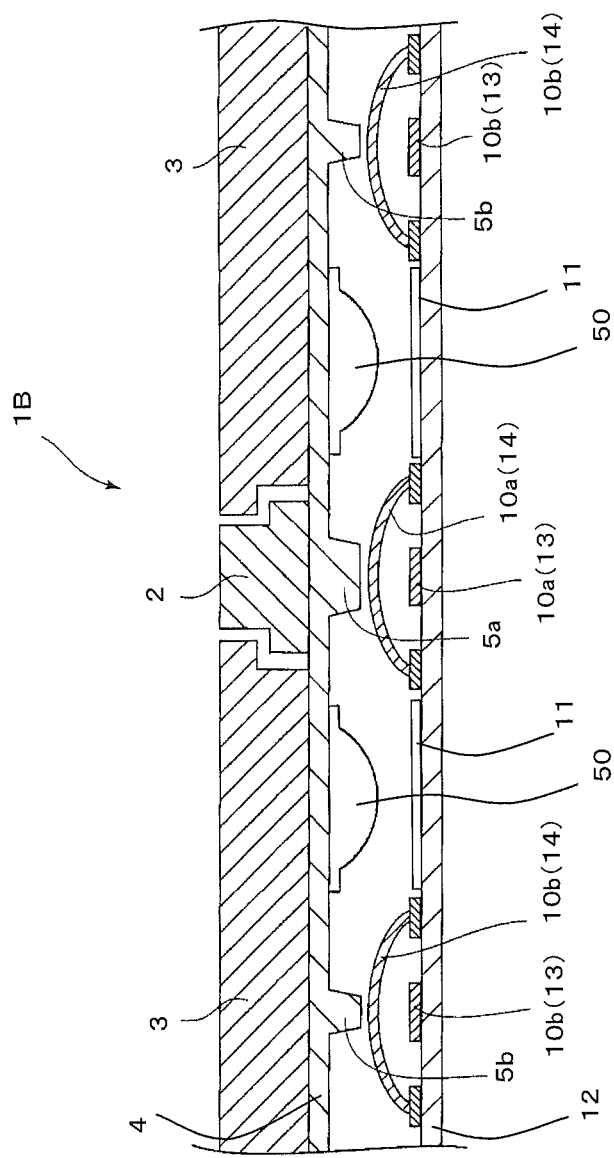
FIG. 9 An enlarged sectional view of an electronic device according to a second embodiment of the present invention in a region similar to the region B indicated by the chain line of FIG. 1, taken along a line similar to the line A-A.
Figure 10:
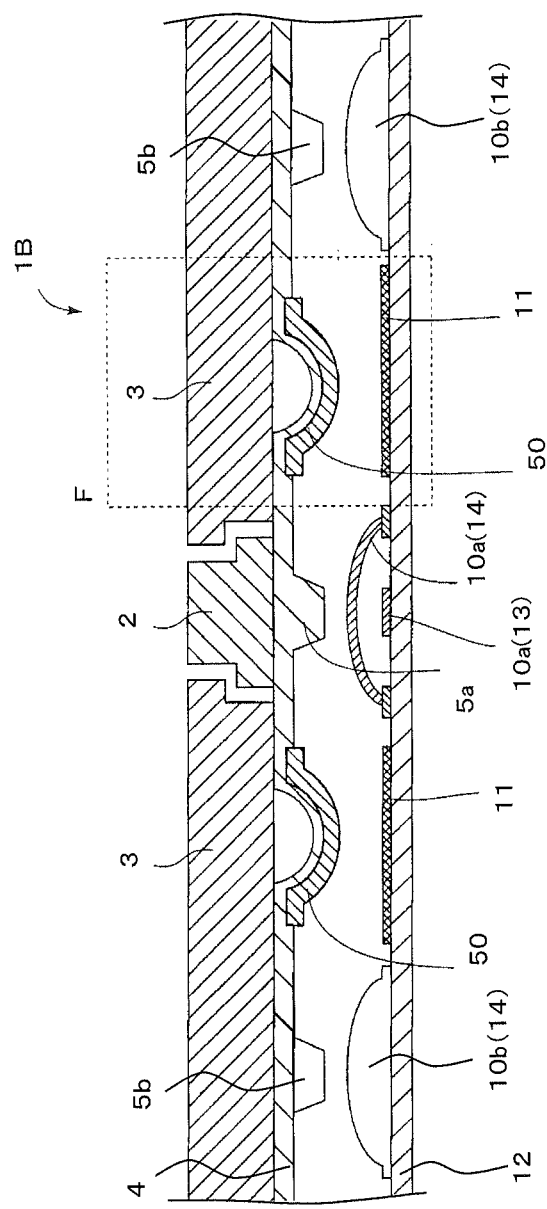
FIG. 10 An enlarged sectional view of the electronic device according to the second embodiment of the present invention in the region similar to the region B indicated by the chain line of FIG. 1, taken along a line similar to the line C-C.

FIG. 9 is an enlarged sectional view of the region B indicated by the chain line of FIG. 1, taken along the line A-A. FIG. 10 is an enlarged sectional view of the region B indicated by the chain line of FIG. 1, taken along the line C-C.

As illustrated in FIG. 10, in the input device 1B of the second embodiment, at positions on the back side of the elastic sheet 4 corresponding to the operation panel 3, convex bodies 50 are formed as the conductive elastic bodies 6, the convex bodies 50 being formed of the conductive elastic bodies integrated with the elastic sheet 4. Each of the convex bodies 50 is a member having a hollow inside, and a curved contour made of a conductive rubber. However, the shape of the convex body 50 is not limited to a semicircular shape. As long as, by depressing the operation panel 3 strongly, the convex body 50 can be largely deformed and a contact area with the sensor portion 11 can be increased, the convex body 50 may be formed into any shape such as a cone, a pyramid, or a shape obtained by cutting away the tip from the cone or the pyramid.

Further, it is preferred that an elastic body, which is easily deformed when a finger touches the front surface of the operation panel 3, be used as a material for the conductive elastic bodies 6 constituting the input device 1B. Examples of the elastic body include a rubber and an elastomer in which carbon black or the like is dispersed as a conductive filler.

Figure 11:
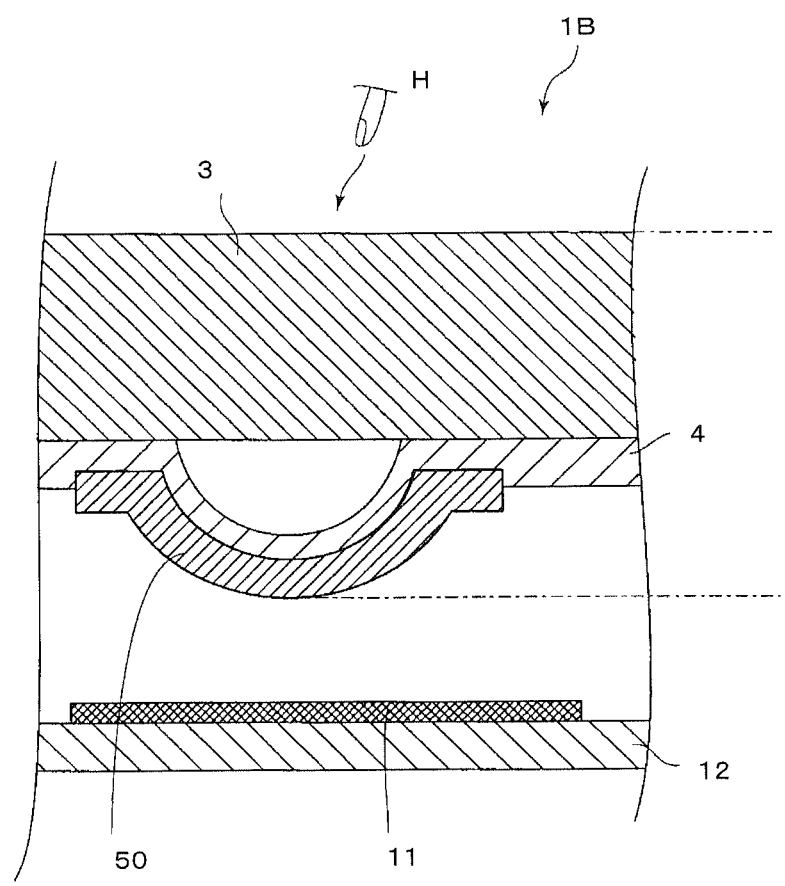
FIG. 11 An enlarged sectional view of a region F indicated by the dotted line of FIG. 10.

Next, usage and actions of the input device 1B are described. FIG. 11 is an enlarged sectional view of a region F indicated by the dotted line of FIG. 9.

In this embodiment, as illustrated in FIG. 11, when a user puts a finger on a target pressing position H of the operation panel 3 of the input device 1B and then applies a pressure lightly, one or a plurality of convex bodies 50 on the back side of the pressed portion are depressed. Consequently, the one or the plurality of convex bodies 50 come into contact with a conductive pattern constituting the sensor portions 11. Then, a short circuit occurs between the electrodes of each sensor portion 11 through the convex body 50. When being further depressed strongly, the convex body 50 is largely deformed, and thus the contact area with the sensor portion 11 increases. A change in voltage value, current value, or resistance value, which is caused by a change in contact area of the one or the plurality of sensor portions 11 obtained through a series of the operations, is measured by the central processing unit (not shown) as the determination section provided in the input device 1B. In this way, the electronic device 1 can grasp a pressing force and a direction of a key that a finger touches. That is, when a user glides a finger on the operation panel 3 like drawing a circle, a trace of the finger can be easily detected. As a result, for example, the determination section can detect speed or direction of the glide of the finger on the operation surface of the operation panel 3, and the execution section can scroll the display section. Further, the operation surface of the operation panel 3 can be operated as a multi-directional key.

Meanwhile, as illustrated in FIG. 9, in combination with the pushers 5b, the fixed contact points 13 in this embodiment are used as a 4-direction key. When the pusher 5b presses the conductive belleville-spring member 14 opposing the pusher 5b, the belleville-spring member 14 is buckled, and hence a clear click feeling is given to a user. In addition, the belleville-spring member 14 comes into contact with the fixed contact point 13, and the belleville-spring member 14 brings electrodes of the fixed contact point 13 into conduction. In this way, pressing of a part of the member to be pressed 10 is recognized. As a result, if all of operation methods are controlled by a program or a software according to operation modes, the sensor portions 11 and the fixed contact points 13 constituting the input device 1B are used depending on the application, which enables multifaceted operations.

As described above, the input device 1B can efficiently realize a function of multi-directional detection at a contact position. In addition, the convex body 50 has the hollow inside, and hence the convex body 50 can be easily deformed. In particular, when a contour of the convex body 50 is thin, the convex body 50 can be more easily deformed. Thus, it is possible to obtain the input device 1B allowing input even with a smaller force, that is, the input device 1B with improved operability.

Figure 12:
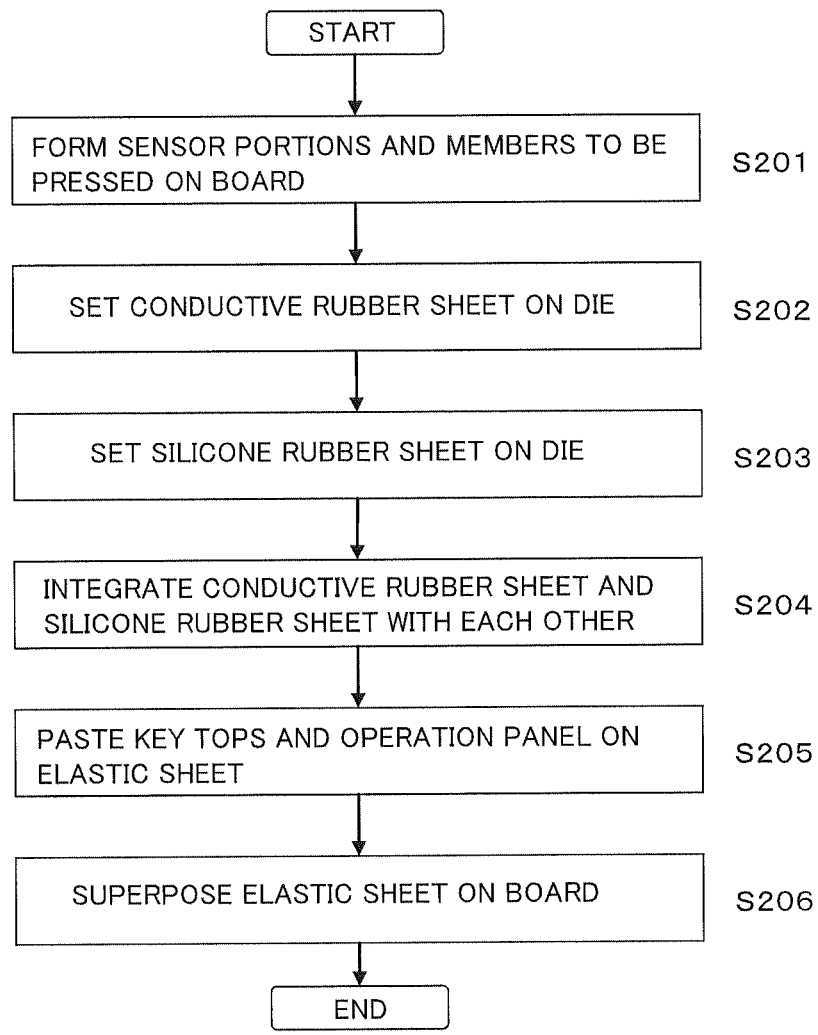
FIG. 12 A flowchart illustrating processes of manufacturing an input device according to the second embodiment of the present invention.
Figure 13:
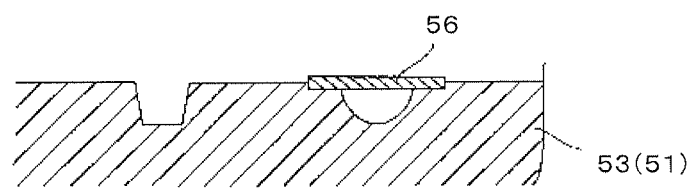
FIG. 13 A sectional view illustrating a part of the processes of manufacturing the input device according to the second embodiment of the present invention.
Figure 14:
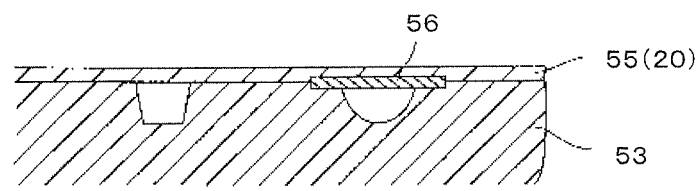
FIG. 14 A sectional view illustrating a part of the processes of manufacturing the input device according to the second embodiment of the present invention.
Figure 15:
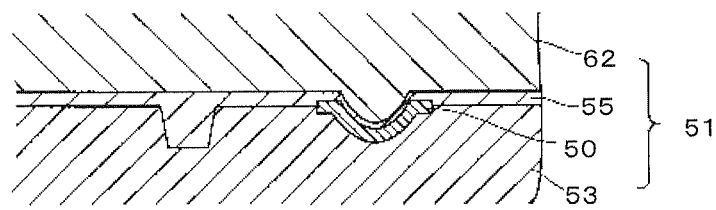
FIG. 15 A sectional view illustrating a part of the processes of manufacturing the input device according to the second embodiment of the present invention.

Next, a method of manufacturing the input device 1B is described. FIG. 12 is a flowchart illustrating processes of manufacturing the input device 1B. FIGS. 13 to 15 are views each illustrating a part of a process of manufacturing the input device 1B step by step.

First, the sensor portions 11 and the members to be pressed 10 are arranged on the board 12 (Step S201). Specifically, the fixed contact points 13 are first formed on the board 12. Next, the belleville-spring members 14 are arranged so that the dome-shaped conductive belleville-spring members 14 cover the fixed contact points 13. As the board 12, the printed circuit board on which a predetermined wiring pattern is formed can be preferably used. Further, the conductive belleville-spring members 14 are more preferably made of stainless steel. However, a material of the belleville-spring members 14 is not limited to stainless steel, and may be made of another metal, a conductive resin, or the like. Note that, when the conductive belleville-spring members 14 are made of stainless steel, it is possible to obtain a satisfactory click feeling and a satisfactory operation feeling. As a method of arranging the conductive belleville-spring members 14, for example, an adhesive sheet of which the conductive belleville-spring members 14 are arranged on an adhesive surface pasted on the board 12. Consequently, the conductive belleville-spring members 14 are fixed.

After Step S201, the elastic sheet 4 on which the conductive elastic bodies 6 and the pushers 5 are to be arranged is formed. In this embodiment, as illustrated in FIG. 13, a conductive rubber sheet 56 with a predetermined diameter is set on a molding die 51 (Step S202). Next, as illustrated in FIG. 14, a silicone rubber sheet 55 for forming the elastic sheet 4 is further arranged on the molding die 51 so as to cover the conductive rubber sheet 56 (Step S203).

Subsequently, as illustrated in FIG. 15, integral molding for forming the convex bodies 50 and the pushers 5 integrally with the elastic sheet 4 is performed (Step S204). Specifically, the conductive rubber sheet 56 and the silicone rubber sheet 55 are sandwiched between a heated convex die 52 and a heated concave die 53, and then the dies are closed. In this way, the elastic sheet 4 integrally including the convex bodies 50 and the pushers 5 is molded. As the elastic sheet 4, the silicone rubber sheet 55 can be preferably used. However, the present invention is not limited thereto, and as well as the silicone rubber sheet 55, a urethane sheet may be used as the elastic sheet 4.

Then, the operation panel 3 and the key tops 2 are pasted on the surface of the elastic sheet 4 by the adhesive (Step S205). Finally, the elastic sheet 4 is superposed on the board 12 prepared in Step S201, and is placed in the casing of the electronic device 1 (Step S206). In the above-mentioned manufacturing process, it is preferred to mold the elastic sheet 4 integrally including the convex bodies 50 and the pushers 5. However, after molding the convex bodies 50 and the elastic sheet 4 integrally, the pushers 5 may be formed at predetermined positions of the elastic sheet 4 in another process.

Note that, the operation panel 3 and the key tops 2 may be bonded onto the elastic sheet 4 by the adhesive, or may be bonded onto the elastic sheet 4 through the adhesive layer such as a double-coated tape or by thermal fusion bonding or the like. Further, after forming the convex bodies 50 and the elastic sheet 4 separately, the convex bodies 50 and the elastic sheet 4 may be pasted each other by the adhesive, to thereby be integrated. Thus, Steps S202 to S206 do not have to be performed in the above-mentioned order, that is, the order of Steps may be appropriately changed.

Third Embodiment

Next, the electronic device 1 and an input device 1C according to a third embodiment of the present invention are described with reference to FIGS. 16 to 19. In the third embodiment, components common to those of the first embodiment are denoted by the same reference symbols, and description of the common components is omitted. Note that, in this embodiment, in FIG. 1, the input device 1C having a configuration different from that of the input device 1A of the first embodiment is employed.

Figure 16:
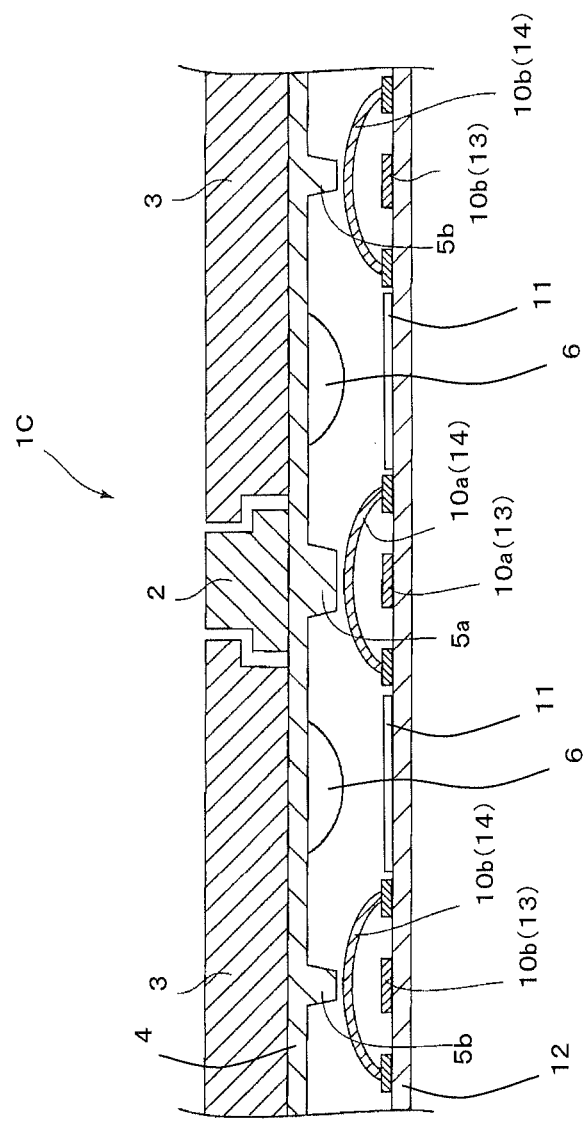
FIG. 16 An enlarged sectional view of an electronic device according to a third embodiment of the present invention in a region similar to the region B indicated by the chain line of FIG. 1, taken along a line similar to the line A-A.
Figure 17:
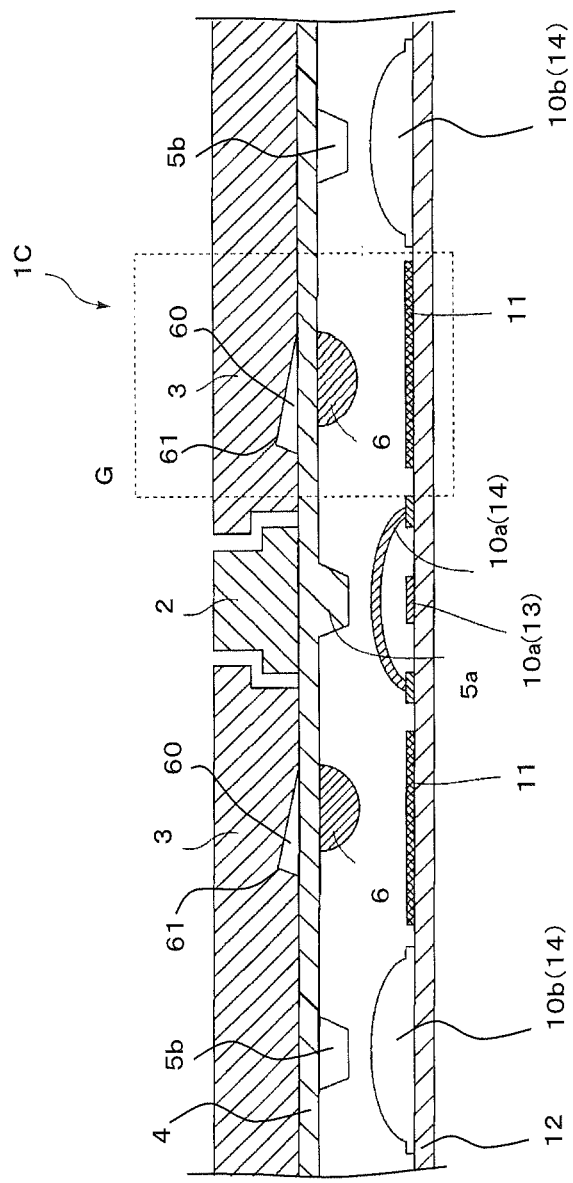
FIG. 17 An enlarged sectional view of the electronic device according to the third embodiment of the present invention in the region similar to the region B indicated by the chain line of FIG. 1, taken along a line similar to the line C-C.

FIG. 16 is an enlarged sectional view of the region B indicated by the chain line of FIG. 1, taken along the line A-A. FIG. 17 is an enlarged sectional view of the region B indicated by the chain line of FIG. 1, taken along the line C-C.

As illustrated in FIG. 17, in the input device 1C according to the third embodiment, recesses 60 are provided in the back surface of the operation panel 3. The recesses 60 are recessed toward the front surface of the operation panel 3. In this embodiment, with reference to the center of each recess 60 in plan view from the front surface side of the recess 60, the recess 60 includes, near an edge portion on a radially outer side thereof, a deepest portion 61 having a largest dimension in a depth direction of the recess 60. That is, in the recess 60, the deepest portion 61 is formed at a position close to the radially outer side relative to an edge portion on the center side of the operation panel 3.

In addition, in a radiation direction with reference to the center L of the operation surface of the operation panel 3, an inclination angle of a surface extending from the deepest portion 61 to an edge on a radially outer side of the operation panel 3 is larger than an inclination angle of a surface extending from the deepest portion 61 to an edge on a radially inner side of the operation panel 3, that is, the recess 60 has a so-called substantially conical shape. However, the shape of the recess 60 is not limited to that of the above-mentioned embodiment, and may be changed into various shapes as needed. For example, the deepest portion 61 may be formed above a center of an opening bottom surface of the recess 60. Further, it is preferred that a projected area of the recess 60 in a plane horizontal to the operation surface of the operation panel 3 be larger than an area of the conductive elastic body 6 which comes into contact with the elastic sheet 4.

Note that, it is good to adjust the size of the recess 60 as needed depending on the thickness of the elastic sheet 4 and the area of the conductive elastic body 6 coming into contact with the elastic sheet 4. Thus, it is possible to further alleviate operation load. Further, when the edge portion of the recess 60 and the edge portion of the conductive elastic body 6 are compared on the radially inner side with respect to the center L of the operation surface of the operation panel 3, it is preferred that the edge portion of the conductive elastic body 6 coincide with the edge portion of the recess 60, or the edge portion of the conductive elastic body 6 be situated inward of the edge portion of the recess 60. This is because, when the conductive elastic body 6 is depressed through the operation panel 3, mainly the elastic sheet 4 near just below the deepest portion 61 of the recess 60 can be deformed so as to enter the recess 60. As a result, the elastic sheet 4 below an entire region of the recess 60 is not entirely deformed, and hence stable electric change can be easily obtained.

Further, the board 12 is provided to be opposed to the elastic sheet 4. On a surface of the board 12 opposed to the elastic sheet 4, the sensor portions 11 and the members to be pressed 10 are provided. That is, just below the recesses 60, the conductive elastic bodies 6 are arranged through the elastic sheet 4, and the conductive elastic bodies 6 and the sensor portions 11 are provided to be opposed to each other. Meanwhile, as illustrated in FIG. 17, in a portion of the back surface opposed to the members to be pressed 10, the recesses 60 are not provided.

The input device 1C as described above can function as an input device having a function of multi-directional detection, and can alleviate the pressing force when performing the multi-directional detection.

Next, usage and actions of the input device 1C are described.

Figure 18:
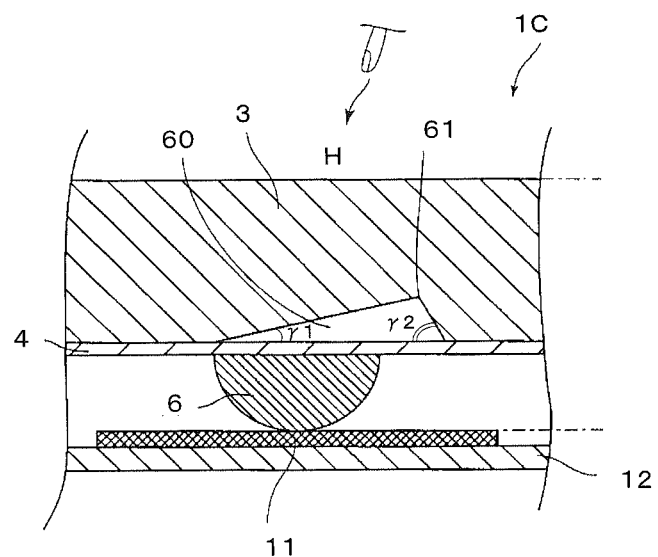
FIG. 18 An enlarged sectional view illustrating a state in which no load is applied to a pressing position H of the operation panel in a region G indicated by the dotted line of FIG. 17.
Figure 19:
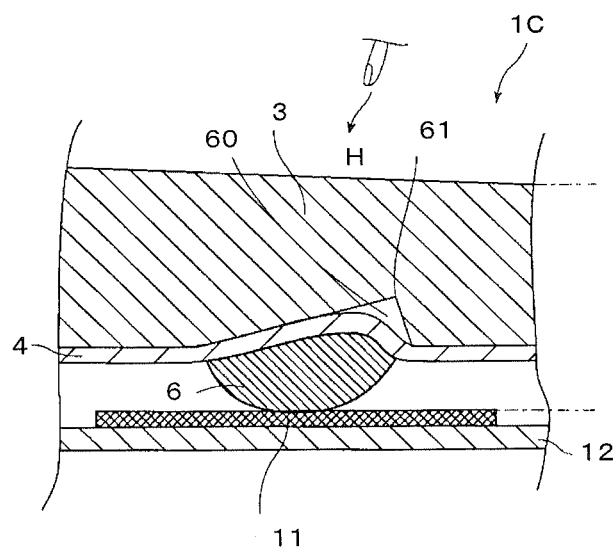
FIG. 19 An enlarged sectional view illustrating a state in which load is applied to the pressing position H of the operation panel in the region G indicated by the dotted line of FIG. 17.

FIG. 18 and FIG. 19 are enlarged sectional views of a region G indicated by the dotted line of FIG. 17. FIG. 18 illustrates a state in which no load is applied to the pressing position H of the operation panel 3. Further, FIG. 19 illustrates a state in which load is applied to the pressing position H of the operation panel 3.

When, under the state illustrated in FIG. 18, a user puts a finger on the target pressing position H of the operation panel 3 of the input device 1C and then applies a pressure lightly, one or a plurality of conductive elastic bodies 6 on the back side of the pressed portion are depressed. Consequently, the one or the plurality of conductive elastic bodies 6 come into contact with the conductive pattern constituting the sensor portions 11. Then, a short circuit occurs between the electrodes of each sensor portion 11 through the conductive elastic body 6.

Moreover, as illustrated in FIG. 19, when depressing the operation panel 3 strongly, the conductive elastic body 6 is largely deformed together with the elastic sheet 4 to increase the contact area with the sensor portion 11 while entering the recess 60 of the operation panel 3. Here, when operating the circular or annular input device 1C, a user tends to touch the outer side of the operation panel 3 for operation. Therefore, it is preferred that the recess 60 include the deepest portion 61 on the outer side with respect to the center thereof. In addition, it is preferred that the recess 60 have such a shape that an inclination angle (angle indicated by $\gamma 2$ of FIG. 18) of a surface extending from the deepest portion 61 to the edge opposite to the center of the operation panel 3 is larger than an inclination angle (angle indicated by $\gamma 1$ of FIG. 18) of a surface extending from the deepest portion 61 to the edge on the center side of the operation panel 3. With this design, the deepest portion 61 is formed in the outer portion of the recess 60 to which larger load is applied, and hence the conductive elastic body 6 and the elastic sheet 4 easily enter the recess 60. As a result, the operability of the input device 1C can be improved.

Meanwhile, as illustrated in FIG. 19, in combination with the pushers 5b, the members to be pressed 10b in this embodiment can be used as a 4-direction key. A change in voltage value, current value, or resistance value, which is caused by a change in contact area of the one or the plurality of sensor portions obtained through a series of the operations, is measured by a central processing unit (CPU) (not shown) of the input device 1C. In this way, it is possible to detect the pressing force and a direction of the key that a finger presses. In comparison with structure in which the recesses 60 are not formed, the load for performing the operation becomes smaller, and hence it is possible to improve the operability.

As described above, in the input device 1C, the function of multi-directional detection is efficiently realized by a trace of contact, and owing to formation of the recesses 60, easy operation is achieved even with a small pressing force. Further, it is possible to provide the input device 1C allowing multifaceted operations.

Figure 20:
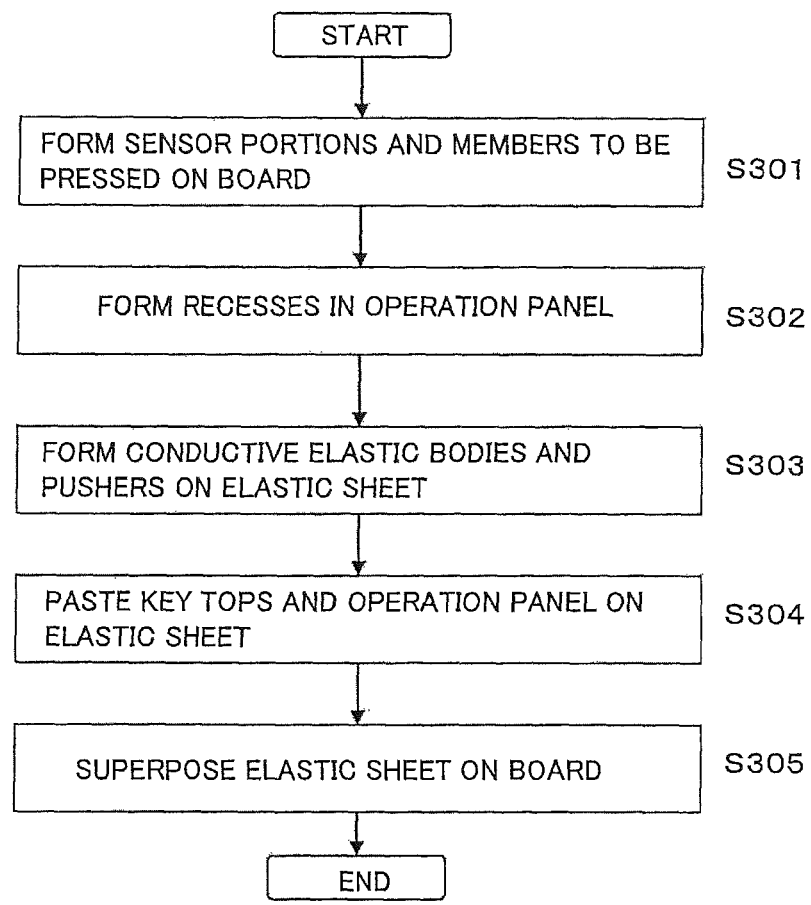
FIG. 20 A flowchart illustrating processes of manufacturing an input device according to the third embodiment of the present invention.

Next, a method of manufacturing the input device 1C is described. FIG. 20 is a flowchart illustrating processes of manufacturing the input device 1C.

First, the board 12 on which the sensor portions 11 and the members to be pressed 10 are arranged is formed (Step S301). In this embodiment, the sensor portions 11 are constituted by a conductive pattern in which a pair of comb-teeth-like electrodes are in a non-contact meshing state. By arranging the conductive pattern on the board 12, the sensor portions 11 are formed. Further, each of the members to be pressed 10 is constituted by the fixed contact point 13 and the conductive belleville-spring member 14. The belleville-spring member 14 is formed into a dome shape, and is arranged so as to cover the fixed contact point 13.

Subsequent to Step S301, the recesses 60 are formed in the operation panel 3 (Step S302). In this embodiment, in a process of forming the recesses 60, it is preferred to manufacture the operation panel 3 having the recesses 60 formed therein by injection molding using a molding die. However, the forming process is not particularly limited thereto. Other than the injection molding, the recesses 60 may be formed by, for example, cutting the operation panel which is molded in advance.

Further, it is preferred that, in a plane horizontal to the front surface of the board 12 (hereinafter, referred to as horizontal plane), the projected area of the recess 60 be larger than the area of the conductive elastic body 6 coming into contact with the elastic sheet 4. Note that, the size of the recess 60 may be adjusted as needed depending on the thickness of the elastic sheet 4 and the area of the conductive elastic body 6 coming into contact with the elastic sheet 4. For example, when the thickness of the elastic sheet 4 is 0.2 mm, a projected circle of the recess 60 in the horizontal plane has a diameter larger by 0.2 mm than a diameter (3 mm) of the conductive elastic body 6, i.e., has a diameter of 3.2 mm. With this configuration, the effect of alleviating the operation load can be exerted. It is particularly preferred that the diameter of the projected circle be 4.2 mm or less. When the diameter is 4.2 mm or less, it is possible to apply sufficient load to the conductive elastic body 6, and to more effectively convert a natural change in load at the time of operation into a signal.

Further, it is preferred that the depth dimension of the recess 60 be smaller than the height dimension of the conductive elastic body 6. With this configuration, the conductive elastic body 6 does not entirely enter the recess 60, and the conductive elastic body 6 can reliably come into contact with the sensor portion 11. Consequently, it is possible to obtain satisfactory operation. Further, by a processing method such as laser etching or hairline processing, a discrimination portion indicating a function may be formed on the front surface of the operation panel 3. Further, by a method such as spreading (spray) or coating, a transparent resin-coated layer may adhere to the front surface of the operation panel 3. As resin coatings used for the transparent resin-coated layer, for example, acrylic-based, epoxy-based, vinyl ether-based, oxetane-based, and unsaturated polyester-based resin coatings can be preferably used. In particular, it is preferred to use the resin coatings with high hardness. However, the above-mentioned resin coatings are merely given as examples, and another resin coating may be adopted.

Subsequent to Step S302, the conductive elastic bodies 6 and the pushers 5 are formed on the elastic sheet 4 (Step S303). Specifically, at positions on the back surface of the previously-molded elastic sheet 4, the positions being opposed to the sensor portions 11 and the members to be pressed 10, the previously-molded conductive elastic bodies 6 and the previously-molded pushers 5 are pasted by the adhesive, respectively. As a result, it is possible to obtain the elastic sheet 4 on which the conductive elastic bodies 6 and the pushers 5 are arranged. Next, the operation panel 3, which includes the recesses 60 obtained in Step S302 described above, is pasted on the front surface of the elastic sheet 4 by the adhesive (Step S304). Finally, the elastic sheet 4 is superposed on the board 12 prepared in Step S301 (Step S305).

Note that, the operation panel 3, the conductive elastic bodies 6, or the pushers 5 may be bonded onto the elastic sheet 4 by the adhesive, or may be bonded onto the elastic sheet 4 through the adhesive layer such as a double-coated tape or by thermal fusion bonding or the like. Further, it is preferred that the elastic sheet 4 and the pushers 5 be made of the same material and formed by integral molding in one step. In this case, first, there is prepared a molding die with which the shapes of the pushers 5 can be formed. Next, the conductive elastic bodies 6 are arranged in the molding die. In addition, as a raw material for the elastic sheet 4, for example, a silicone rubber is arranged in the molding die, and molding is performed through heating and compressing to cure the silicone rubber. Consequently, it is possible to obtain the elastic sheet 4 integrally including the conductive elastic bodies 6 and the pushers 5. Thus, the processes of manufacturing can be simplified.

Figure 21:
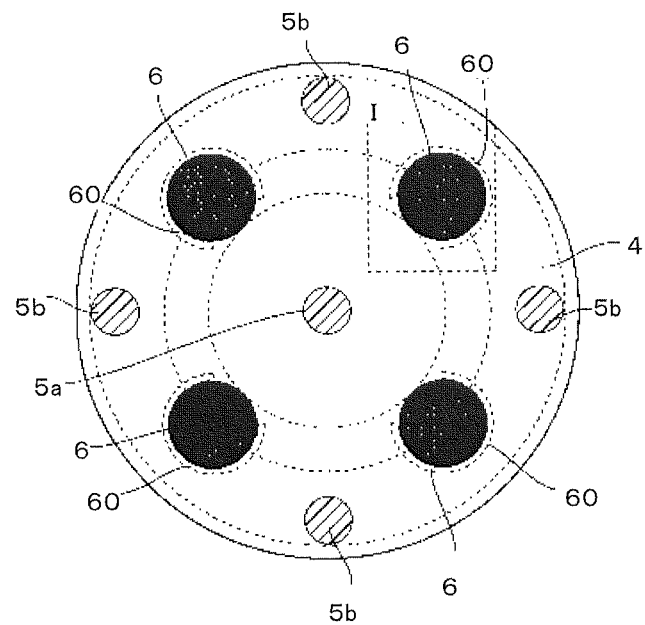
FIG. 21 A plan view of a back side of the operation panel according to another embodiment in the region B indicated by the chain line of FIG. 1, when viewed from the back surface in the third embodiment of the present invention.
Figure 22:
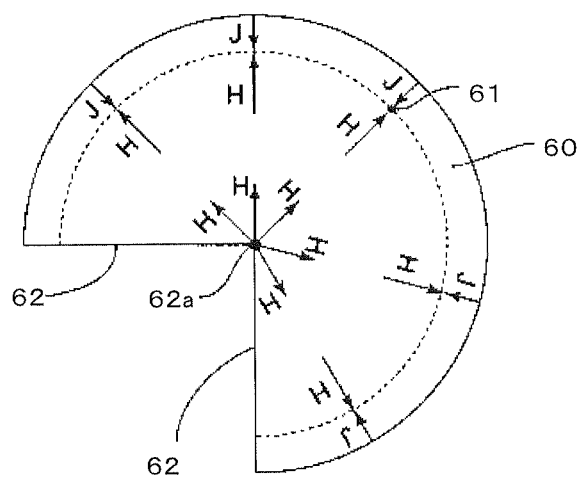
FIG. 22 An explanatory diagram of a recess to be arranged on a back side of a conductive member in a region I indicated by the dotted line of FIG. 21.
Figure 23:
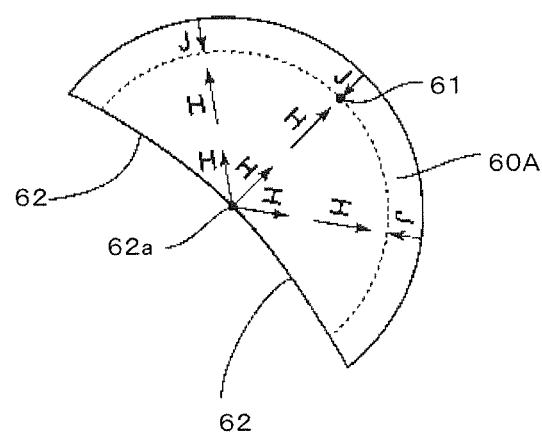
FIG. 23 An explanatory diagram illustrating a modified example of the recess to be arranged on the back side of the conductive member in the region I indicated by the dotted line of FIG. 21.
Figure 24:
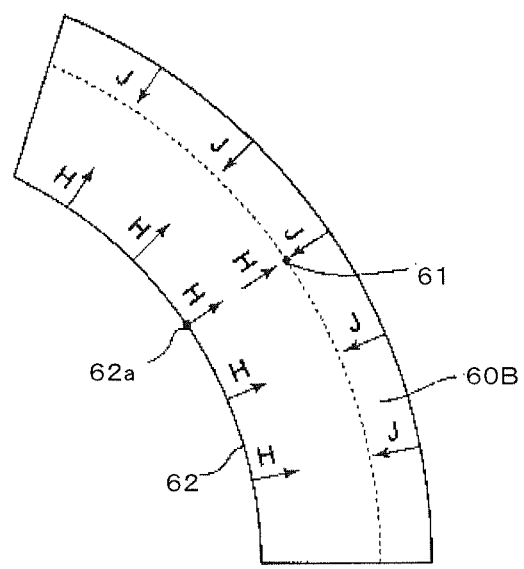
FIG. 24 An explanatory diagram illustrating a modified example of the recess to be arranged on the back side of the conductive member in the region I indicated by the dotted line of FIG. 21.

Next, a modified example of the recesses 60 is described. FIG. 21 is a plan view of the region B indicated by the chain line of FIG. 1, when the operation panel 3 is viewed from the back surface. FIG. 22 is a view of the recess 60 to be arranged on the back side of the conductive elastic body 6 in a region I indicated by the dotted line of FIG. 21. FIG. 23 and FIG. 24 are views of recesses 60A and 60B to be arranged on the back side of the conductive elastic body 6 in the region I indicated by the dotted line of FIG. 21.

As illustrated in FIG. 21 and FIG. 22, the conductive elastic bodies 6 and the pushers 5 are provided on the back side of the elastic sheet 4. The conductive elastic bodies 6 and the pushers 5 are arranged to be opposed respectively to the sensor portions 11 and the members to be pressed 10 arranged on the board 12. Further, the conductive elastic bodies 6 and the pushers 5, and the sensor portions 11 and the members to be pressed 10 are arranged so as not to overlap each other in both the radial direction and the circumferential direction. The operation panel 3 is provided with the recesses 60 recessed from the back surface of the operation panel 3 toward the front surface thereof.

The recess 60 includes the deepest portion 61 at which the depth of the bottom surface of the operation panel 3 is 0.2 mm. Further, in plan view of the back surface of the operation panel 3, the deepest portion 61 of the recess 60 is provided closer to the radially outer side of the operation panel 3 than the radial center of the conductive elastic body 6. Further, of an outer peripheral edge of the recess 60, linear edge portions 62 situated on the radially inner side of the operation panel 3 form an angle of about 90 degrees at an intersection 62a. A region having two sides surrounded by the edge portions 62 on the radially inner side of the operation panel 3 serves as a support portion for supporting the conductive elastic body 6. That is, in the horizontal plane, the projected area of the support portion overlaps a part of the projected area of the conductive elastic body 6.

Further, in proportion to a distance in the radiation direction from the intersection 62a, the depth of the recess 60 gradually increases from the intersection 62a toward the deepest portion 61 (that is, the recess 60 is inclined downward in an arrow H direction). Meanwhile, in inverse proportion to the distance in the radiation direction from the intersection 62a, the depth of the region extending from the deepest portion 61 to the outer peripheral edge of the recess 60 gradually decreases (that is, the recess 60 is inclined steeply downward in an arrow J direction). In addition, in terms of the inclination angle in the radiation direction with reference to the intersection 62a, the region extending from the deepest portion 61 to the outer peripheral edge of the recess 60 is larger than the region extending from the deepest portion 61 to the outer peripheral edge of the recess 60.

However, the shapes of the edge portions 62 for deforming the conductive elastic body 6 are not limited to those of the above-mentioned embodiments, and may be modified into various shapes as needed. For example, as illustrated in FIG. 23 and FIG. 24, the edge portions 62 may be formed into an arc or a curved line with reference to the center of the operation panel 3. In plan view of the recess 60 from the back side of the operation panel 3, the recess 60 may have a planar shape constituting a part of a circle with reference to the center of the operation surface of the operation panel 3. Note that, it is preferred to adjust the size and the shape of the recess 60 as needed depending on the thickness of the elastic sheet 4 and the area of the conductive elastic body 6 coming into contact with the elastic sheet 4. Thus, it is possible to control the effect of alleviating the operation load.

In the above description, the input device 1A, the input device 1B, and the input device 1C according to the embodiments of the present invention (hereinafter, the input device 1A, the input device 1B, and the input device 1C are abbreviated as the input devices 1A, 1B, and 1C) and the preferred examples of the electronic device 1 using the same are described. However, the present invention is not limited to the above-mentioned embodiments, and various modifications can be made.

For example, in each of the embodiments, the diameter, the angle, the distance, and the like are specifically described, but are not limited to the numerical values in the above description. Other numerical values may be used. For example, each parameter may be changed along a change in size of the operation panel 3. Further, it is not always necessary to arrange the recesses 60, the conductive elastic bodies 6, the sensor portions 11, the members to be pressed 10b, and the pushers 5b at equal intervals. Further, the numerical values described in the specification are not limited to the above-mentioned specific numerical values, and include an error or a tolerance. For example, the angle Z is set to 22.5 degrees. However, the angle is preferred in view of space saving and the like as long as the angle falls within a range of from 20 to 25 degrees. Further, the angle may be set to 0 degrees or other values.

Figure 25:
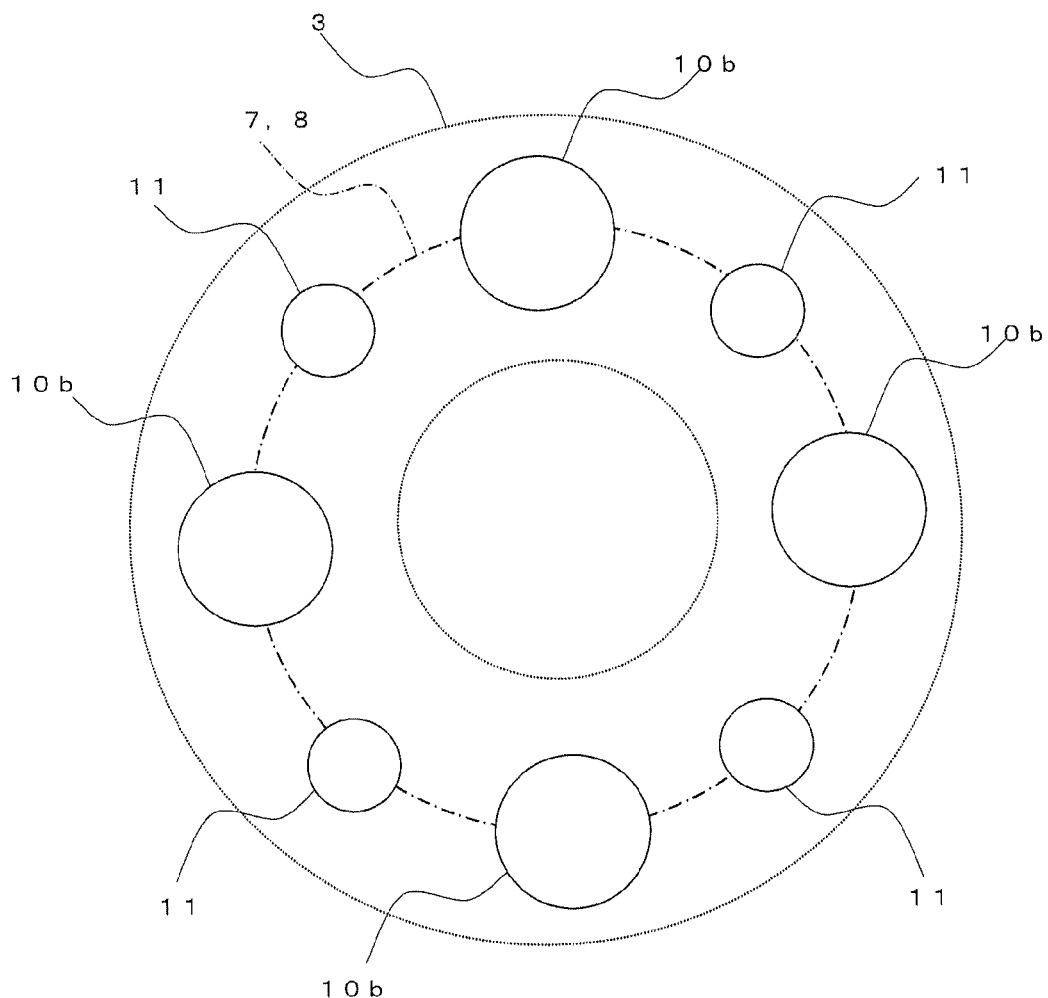
FIG. 25 An explanatory diagram illustrating a modified example of each embodiment.

Further, in FIG. 5, the centers of the members to be pressed 10b and the centers of the sensor portions 11 do not overlap one another in the radial direction with reference to the center L, but the outer peripheries of the members to be pressed 10b and the outer peripheries of the sensor portions 11 overlap one another in the radial direction. However, such overlaps in the radial direction may be completely eliminated. That is, such an arrangement is more preferred that the outer peripheries of the members to be pressed 10b and the outer peripheries of the sensor portions 11 do not overlap one another in the radial direction with reference to the center L. Note that, as illustrated in FIG. 4, the pushers 5b and the conductive elastic bodies 6 are arranged and shaped so as not to overlap one another at all in the radial direction, which is preferred. However, such an arrangement may be adopted that the centers of the pushers 5b and the centers of the conductive elastic bodies 6 do not overlap one another in the radial direction but the outer peripheries thereof overlap one another slightly in the radial direction. Alternatively, FIG. 25 illustrates a modified example of the arrangement of the members to be pressed 10b and the sensor portions 11 on the board. As illustrated in FIG. 25, the centers of the pushers 5b and the centers of the conductive elastic bodies 6 may be arranged on the same circumference.

Further, in each of the embodiments, the conductive elastic bodies 6 or the sensor portions 11 are provided at eight points, but may be provided at seven or less points, or nine or more points depending on the thicknesses and the sizes of the operation panel 3, the members to be pressed 10b, the pushers 5b, the conductive elastic bodies 6, and the sensor portions 11. When the conductive elastic bodies 6 or the sensor portions 11 are provided at less than eight points, provision at three or more points enables the operation panel 3 to satisfactorily function as a control disk. Further, similarly, the members to be pressed 10b or the pushers 5b are provided at four points, but may be provided at any points. Further, the number of the key tops 2 situated at the center of the operation panel 3 does not have to be one, but may be plural.

Further, in each of the embodiments, the sensor portion 11 has a comb-teeth-like electrode pattern, but is not limited to such a shape. For example, the sensor portion 11 may have a concentric pattern or other shapes. Further, there may be used a sensor for measuring a compression ratio of the conductive elastic body with capacitance. Further, there may be employed a system using the conductive elastic body having an improved conductivity by being compressed or the conductive elastic body having a change in voltage value, current value, or resistance value by being compressed, to thereby measure a pressure applied to the conductive elastic body.

Further, in each of the embodiments, the distance $\beta$ is larger than the distance $\alpha$. However, the present invention is not limited to the embodiments described above. The distance $\beta$ may be equal to the distance $\alpha$, or the distance $\beta$ may be smaller than the distance $\alpha$. However, when the distance $\beta$ is larger than the distance $\alpha$, before the conductive elastic body 6 comes into contact with the board 12, the member to be pressed 10b and the pusher 5b do not come into contact with each other. Thus, the member to be pressed 10b and the pusher 5b do not cause the trouble, and hence the operation panel 3 is easily depressed toward the board 12. Therefore, when the distance $\beta$ is larger than the distance $\alpha$, owing to a slight difference of load, it is possible to change a contact amount of the conductive elastic body 6 with the board 12. That is, there is provided a control disk capable of detecting the slight difference of load applied to the operation panel 3.

Further, the embodiments employ the input devices 1A, 1B, and 1C each functioning both as a push-button switch and as a control disk, but the present invention is not limited to the embodiments described above. For example, each input device may function only as the push-button switch or only as the control disk. In addition, there may be employed the electronic device 1 allowing a user to select the function of the input device from the function only as the push-button switch, the function only as the control disk, and the function both as the push-button switch and the control disk.

Further, in each of the embodiments of the present invention, the key tops 2 and the operation panel 3 are pasted on the elastic sheet 4 by the adhesive, but attaching means other than the adhesive may be used. For example, attachment with a double-coated tape may be performed, or attachment by thermal fusion bonding or the like may be performed. Further, it is unnecessary that the flat surface portions of the key tops 2 and the operation panel 3, which are opposed to the elastic sheet 4, are entirely fixed onto the elastic sheet 4. For example, the portion between the adjacent key tops 2 or the outer periphery of the operation panel 3 does not need to be bonded onto the elastic sheet 4.

Further, in each of the embodiments of the present invention, the shape of the conductive elastic body 6 is semicircular, but the present invention is not limited to the embodiments described above. For example, there may be used a convex or a protrusion having a radius of curvature of about 2 to 25 mm at a tip portion thereof. Further, by appropriately adjusting the hardness and the tip shape of the conductive elastic body 6 or the distance $\alpha$ from the board 12, it is possible to control operation stability and operation feeling.

Further, in each of the embodiments of the present invention, it is not always necessary to perform the process of attaching the pushers 5 (Step S202). In this case, it is preferred that Step S202 be performed as a process of attaching a key sheet provided with the shapes of the pushers 5 in advance. Further, formation of each member on the elastic sheet 4 may be performed in one step by insert molding, outsert molding, or the like.

Further, each of the input devices 1A, 1B, and 1C according to the embodiments of the present invention includes the push-button switch situated inward of the annular operation panel 3, that is, on an inner portion surrounded by the operation panel 3, but the push-button switch is not essential. That is, an input member other than the push-button switch may be provided adjacent to the control disk. Alternatively, the input devices 1A, 1B, and 1C each including only a part functioning as a control disk may be used.

Further, in each of the embodiments of the present invention, the shape of the operation panel 3 is annular, but is not limited to the annular shape. For example, only a part of the circle may be used. Alternatively, any shape may be used, such as a circle, a cross, a straight line, a triangle, a polygon having four or more sides, a curved line, or an ellipse. However, when the operation panel 3 is annular, it is possible to provide the input devices 1A, 1B, and 1C allowing a user to operate while moving a finger continuously without stopping the movement of the finger.

Further, the shape and the position of the recess 60 may be changed as needed depending on the shape and the thickness of the operation panel 3, the shape of the conductive elastic body 6, the arrangement position of the sensor portion 11, or the like. Further, the conductive elastic body 6 may be made of a material other than a conductive rubber. However, when the conductive rubber is used as the material for the conductive elastic body 6, the pressing force for the operation panel 3 can be efficiently detected. Thus, the function of multi-directional detection and a function of decision input can be exerted.

Further, the third embodiment employs the input device including the pushers 5 and the members to be pressed 10, but the present invention is not limited to this embodiment. There may be employed an input device which does not include the pushers 5 and the members to be pressed 10, that is, an input device which allows input only from the conductive elastic bodies 6 and the sensor portions 11, and includes the recesses 60 provided in the back surface of the operation panel 3.

Next, Examples of the present invention are described.
(Sample Producing Method)

First, in order to obtain a conductive member, a crosslinker C-8 (manufactured by Shin-Etsu Chemical Co., Ltd.) was added to a silicone rubber compound KE-951-U (manufactured by Shin-Etsu Chemical Co., Ltd.) containing 50 parts by weight of ketjen black, and the resulting mixture was kneaded. Heating and molding were performed on the thus kneaded unvulcanized conductive rubber by means of a pressing machine, to thereby mold the conductive elastic bodies 6 each having a diameter of 2.5 mm, a height of 0.2 mm, a radius of curvature of 25 mm at a tip portion thereof, and a hardness of 70.

Further, 100 parts by weight of the silicone rubber compound KE-951-U and 1 part by weight of the crosslinker C-8 (manufactured by Shin-Etsu Chemical Co., Ltd.) were mixed together and kneaded, to thereby prepare an unvulcanized rubber as the elastic sheet 4.

Next, the conductive elastic bodies 6 molded as described above were arranged on the second circle 8 in a molding die. The molding die includes recesses formed therein, with which the pushers 5b are to be formed on the first circle 7. Then, the unvulcanized rubber was arranged in the molding die, and was heated and pressurized at 180° C. for 3 minutes. In this way, the conductive elastic bodies 6 and the pushers 5b were formed, by insert molding, integrally on the elastic sheet 4 made of a silicone rubber.

Next, onto a surface of the elastic sheet 4 on which the pushers 5b and the conductive elastic bodies 6 are not formed, the disk-like operation panel 3 having an outer diameter of 20 mm and an inner diameter of 7 mm was pasted with a double-coated tape (manufactured by Nitto Denko Corporation). Of the double-coated tape (manufactured by Nitto Denko Corporation: #5002), one surface having an adhesive for silicone was pasted on the elastic sheet 4 side, and the other surface having an adhesive for acrylic was pasted on the operation panel 3 side.

Next, the metal belleville-spring members 14 each having a diameter of 4 mm, operation load of 1.8N that is required for start of operation, and a movable range of 0.18 mm were prepared. Then, the belleville-spring members 14 were provided on the first circle 7 of a printed circuit board serving as the board 12. Note that, each of the metal belleville-spring members 14 was provided so as to straddle the fixed contact point 13, and was connected and fixed to the conductive portions 15 provided on both sides of the fixed contact point 13. For fixing the belleville-spring members 14, a polyethylene terephthalate sheet having a base material thickness of 0.025 mm and an adhesive layer was used. The input device 1A was produced, in which the metal belleville-spring members 14 were placed to be opposed to the pushers 5b of the elastic sheet 4 on which the operation panel 3 is pasted. There were prepared Examples in which the interval (distance α) between each conductive elastic body 6 and the board 12 and the interval (distance β) between each pusher 5b and each metal belleville-spring member 14 were changed. In addition, there were also prepared Examples in which a diameter of the first circle 7 and a diameter of the second circle 8 were changed. Operation feeling and a condition of malfunction of the input device 1A according to each example were evaluated. The evaluation results are shown in Table 1.

(Criteria)

The operation feeling and the condition of malfunction of the input device 1A were evaluated by the following criteria.

Double circle mark . . . Easy operation is provided in use as a push-button switch and a control disk, and no malfunction occurs.

Single circle mark . . . Uncomfortable feeling is given in use as a push-button switch or a control disk, but no malfunction occurs.

Triangle mark . . . malfunction occurs in use as a push-button switch or a control disk.

TABLE 1

| | Distance α between conductive elastic body and board (mm) | Distance β between metal dome and pusher (mm) | Distance β − Distance α (mm) | Evaluation |
|---|---|---|---|---|
| Example 1 | 0.2 | 0.25 | 0.05 | ⊚ |
| Example 2 | 0.2 | 0.3 | 0.10 | ⊚ |
| Example 3 | 0.2 | 0.35 | 0.15 | ○ |
| Example 4 | 0.3 | 0.35 | 0.05 | ○ |
| Example 5 | 0.2 | 0.2 | 0 | Δ |

Evaluation was made of the operation of the input device 1A according to each of Examples 1 to 5 in which the diameter of the second circle is 9.8 mm and the diameter of the first circle is 15.4 mm (that is, the first circle is situated outward of the second circle). The input device 1A according to each of Examples 1 to 4, in which the distance β is larger than the distance α, allowed satisfactory operation. Meanwhile, in the input device according to Example 5 in which the distance β is equal to the distance α, malfunction often occurred.

In Example 1 and Example 2, the distance β is larger than the distance α, and the distance β is within 0.3 mm. As a result, both in a case of operating as a control disk and in a case of operating as a push-button switch, the input device 1A according to each of Example 1 and Example 2 particularly provided satisfactory operation feeling. Specifically, in the case of operating as the control disk, light touch was enough to operate, whereas in the case of operating as the push-button switch, click feeling was attained.

In the input device 1A according to Example 4, the distance difference between the distance $\beta$ and the distance $\alpha$ is equal to that of Example 1, but the distance $\beta$ is larger than that of Example 1. When operating as the push-button switch, the input device 1A according to Example 4 gave heavy operation feeling for pushing the members to be pressed 10b. This is because the interval (distance $\beta$) between the metal belleville-spring member 14 and the pusher 5b arranged on the back surface of the operation panel 3 was too large, and hence it was necessary to depress or restore the operation panel 3 more largely in order to push the members to be pressed 10b. Further, when operating as the control disk, the input device 1A according to Example 4 gave heavy operation feeling. This is because the distance (distance $\alpha$) for the conductive elastic body 6 to reach the board was also large, and hence the operation panel 3 was largely depressed even when operating as the control disk.

In the input device 1A according to Example 3, the distance $\beta$ is 0.35 mm, and the distance $\alpha$ is 0.2 mm, that is, equal to those of Examples 1 and 2 and Example 5. In the input device 1A according to Example 3, the interval (distance $\beta$) between the metal belleville-spring member 14 and the pusher 5b arranged on the back surface of the operation panel 3 was too large, and hence, in order to push the members to be pressed 10b, the operation panel 3 needed to be largely depressed or restored. Therefore, the input device 1A gave the heavy operation feeling for pushing the members to be pressed 10b.

In the input device 1A according to Example 5, the distance $\beta$ and the distance $\alpha$ were set to 0.2 mm. That is, according to Example 5 in which the distance $\beta$ and the distance $\alpha$ are equal to each other, the malfunction often occurred in the input device 1A.

Next, evaluation was made of the operation of the input device 1A according to Example 6 in which the diameter of the second circle is 15 mm and the diameter of the first circle is 8.5 mm (that is, the first circle is situated inward of the second circle). Note that, in the input device 1A according to Example 6, the first circle is situated inward of the second circle, the distance $\beta$ is smaller than the distance $\alpha$, and the distance $\alpha$ is set to within 0.3 mm. As a result, in the input device 1A according to Example 6, the malfunction often occurred. Further, the input device 1A gave the heavy operation feeling for pushing the members to be pressed 10b.

Next, another example of the present invention is described.

First, a conductive masterbatch 87-C-40-P (manufactured by Shin-Etsu Polymer Co., Ltd.) containing ketjen black as conductive carbon black and a silicone rubber compound KE-961T-U (manufactured by Shin-Etsu Chemical Co., Ltd.) were mixed together in a ratio of 50 parts by weight/50 parts by weight, and were kneaded with 2 parts by weight of the crosslinker C-8. Next, the kneaded material was molded by being pressurized and heated at 180° C. for 4 minutes by means of a 150 t-pressing machine, to thereby obtain the conductive rubber sheet. Thereafter, the obtained conductive rubber sheet was subjected to processing using a precision pressing machine or a laser beam machine, to thereby obtain the conductive rubber sheets each having a diameter of 3 mm.

Next, there was prepared a molding die in which semispherical recesses for forming the convex bodies and recesses for forming the pushers were provided. Then, the conductive rubber sheets each having the diameter of 3 mm were arranged in the molding die. Next, a material containing 100 parts by weight of the silicone rubber compound KE-961T-U (manufactured by Shin-Etsu Chemical Co., Ltd.) and 2 parts by weight of the crosslinker C-8 (manufactured by Shin-Etsu Chemical Co., Ltd.) was arranged on the molding die so as to cover the conductive rubber sheets. Subsequently, between a heated convex die and the heated concave die, the conductive rubber sheets and a silicone rubber sheet were sandwiched, and then the dies were closed. In this way, the convex bodies and the pushers were integrated with the elastic sheet. Then, heating and pressurizing treatment was performed at 150° C. for 180 seconds, and there was obtained a semifinished product as the elastic sheet on which the conductive elastic bodies and the pushers were arranged. In addition, as a secondary cross-linking process, overheating treatment was performed at 150° C. for 30 minutes in an open state. Thus, the elastic sheet as a finished product was obtained.

Then, the operation panel and the key tops each having a predetermined size were pasted on the front surface of the elastic sheet with a double-coated tape for silicone (manufactured by Nitto Denko Corporation).

Next, a printed circuit board on which the sensor portions and pressed portions are to be arranged was prepared. Note that, each of the sensor portions was formed of a sensor in which a pair of comb-teeth-like electrodes are in a non-contact meshing state. Then, each of the pressed portions included the fixed contact point and the conductive belleville-spring member, and the belleville-spring member was formed into a dome shape and formed so as to cover the fixed contact point. Further, at a position opposed to the back surface of the key top, which is to be arranged to be surrounded by the annular operation panel, the fixed contact point and the belleville-spring member made of stainless steel were arranged. Specifically, after arranging the fixed contact point on the board, the dome-shaped belleville-spring member made of stainless steel was formed so as to cover the fixed contact point. For fixing the belleville-spring member made of stainless steel, an insulating adhesive sheet was fixed closely to the board so as to cover at least an outer edge of the belleville-spring member made of stainless steel. Finally, the conductive elastic bodies and the pushers on the elastic sheet on which the operation panel and the key tops were pasted, and the sensor portions and the pressed portions on the board were placed to be respectively opposed to each other. Thus, production of the input device was completed.

The input device obtained under the conditions of the examples of the present invention was able to alleviate the pressing force, and was excellent in operability. That is, the input device allows an operator to lightly press the same to realize the function of multi-directional detection, and provides reliable operability. Further, the convex bodies constituted by the thin conductive elastic bodies are formed, and hence large load is not required when the convex bodies are deformed. Thus, it is possible to achieve satisfactory operability.

The invention claimed is:

1. An input device, comprising:
   an operation panel having an operation surface;
   an elastic sheet disposed on a side of the operation panel opposite to the operation surface;
   a board, which is arranged to be opposed to a flat surface portion of the operation panel;
   a plurality of sensor portions arranged equiangularly along a circumferential direction, each of the plurality of sensor portions being placed on the board to be opposed to a corresponding one of a plurality of conductive elastic bodies arranged equiangularly along the circumferential direction and fixed on the elastic sheet; and a plurality of members to be pressed arranged equiangularly along the circumferential direction and placed on the board, each of the plurality of members to be pressed being opposed to one of a plurality of pushers arranged equiangularly along the circumferential direction and fixed on the elastic sheet, wherein the plurality of members to be pressed and the plurality of sensor portions are arranged so that an imaginary line drawn from an operation center of the operation panel and extending in a direction parallel to the operation surface of the operation panel to a center of a member to be pressed of the plurality of members to be pressed does not cross a part of any sensor portion of the plurality of sensor portions;

wherein the operation panel has one of a circular shape, an annular shape, a shape of a part of a circle, and a shape of a part of a ring;

the plurality of sensor portions is arranged on a first circle concentric with the operation panel, and the plurality of sensor portions is the only element on the board on the first circle;

each of the plurality of members to be pressed comprises a belleville-spring member arranged on a second circle concentric with the operation panel and said second circle having a diameter larger than a diameter of the first circle, the plurality of members to be pressed being the only element on the board on the second circle;

each of the plurality of conductive elastic bodies has a hemispherical shape and protrudes from the elastic sheet toward the sensor portion;

each of the plurality of conductive elastic bodies comprises an electrically conductive rubber; and two sensor portions of the plurality of sensor portions are completely disposed in a smaller of two sectors defined by the operation center of the operation panel and two consecutive members to be pressed in a circumferential direction along the second circle.

2. An input device according to claim 1,
wherein a radial direction extending from the center of the operation surface of the operation panel to a center of one of the plurality of sensor portions does not overlap a radial direction extending from the center of the operation surface of the operation panel to a center of one of the plurality of members to be pressed.

3. An input device according to claim 1, wherein a dimension between the plurality of pushers and the plurality of members to be pressed is larger than a dimension between the plurality of conductive elastic bodies and the plurality of sensor portions.

4. An input device according to claim 1,
wherein the plurality of sensor portions comprises eight sensor portions arranged so that centers thereof are situated at an angle of 45 degrees on a circumference having a diameter of 5 mm or more with reference to the center of the operation surface of the operation panel;

the plurality of conductive elastic bodies comprises eight conductive elastic bodies arranged so that centers thereof are situated at an angle of 45 degrees on a circumference having a diameter of 5 mm or more with reference to the center of the operation surface of the operation panel;

the plurality of members to be pressed comprises four members to be pressed arranged so that centers thereof are situated at an angle of 90 degrees on a circumference having a diameter of 10 mm or more with reference to the center of the operation surface of the operation panel;

the plurality of pushers comprises four pushers arranged so that centers thereof are situated at an angle of 90 degrees on a circumference having a diameter of 10 mm or more with reference to the center of the operation surface of the operation panel, and the center of one of the eight sensor portions and the center of the member to be pressed closest to the one of the eight sensor portions are arranged at an angle of 20 to 25 degrees in the circumferential direction with reference to the center of the operation surface.

5. An input device according to claim 1, wherein the operation panel comprises a recess which is recessed at a position on a back side of the plurality of conductive elastic bodies from the surface opposite to the operation surface toward the operation surface.

6. An input device according to claim 5, wherein the recess has such a shape that a deepest portion having a largest depth dimension is provided closer to a radially outer edge of the recess than a radially inner edge thereof with reference to the center of the operation surface of the operation panel.

7. An input device according to claim 6, wherein the recess is formed so that, with reference to the center of the operation surface of the operation panel, an angle between the operation surface and a surface extending from the radially outer edge of the recess to the deepest portion is larger than an angle between the operation surface and a surface extending from the radially inner edge of the recess to the deepest portion.

8. An input device according to claim 5, wherein the recess has such a shape that a deepest portion is provided closer to a radially outer edge of the recess than a radially inner edge thereof with reference to the centers of the plurality of conductive elastic bodies.

9. An electronic device, comprising:
an input device;
a determination section for determining a content of operation based on a signal from the input device;
an execution section for executing the content of operation based on determination of the determination section; and
a display section for displaying a content to be executed,
the input device, comprising:
an operation panel having an operation surface;
an elastic sheet disposed on a side of the operation panel opposite to the operation surface;
a board, which is arranged to be opposed to a flat surface portion of the operation panel;
a plurality of sensor portions arranged equiangularly along a circumferential direction, each of the plurality of sensor portions being placed on the board to be opposed to a corresponding one of a plurality of conductive elastic bodies arranged equiangularly along the circumferential direction and fixed on the elastic sheet; and
a plurality of members to be pressed arranged equiangularly along the circumferential direction and placed on the board, each of the plurality of members to be pressed being opposed to one of a plurality of pushers arranged equiangularly along the circumferential direction and fixed on the elastic sheet, wherein the plurality of members to be pressed and the plurality of sensor portions are arranged so that an imaginary line drawn from an operation center of the operation panel and extending in a direction parallel to the operation surface of the operation panel to a center of a member to be pressed of the plurality of members to be pressed does not cross a part of any sensor portion of the plurality of sensor portions;

wherein the operation panel has one of a circular shape, an annular shape, a shape of a part of a circle, and a shape of a part of a ring;

the plurality of sensor portions is arranged on a first circle concentric with the operation panel, and the plurality of sensor portions is the only element on the board on the first circle;

each of the plurality of members to be pressed comprises a belleville-spring member arranged on a second circle concentric with the operation panel and second circle having a diameter larger than a diameter of the first circle, the plurality of members to be pressed being the only element on the board on the second circle;

each of the plurality of conductive elastic bodies has a hemispherical shape and protrudes from the elastic sheet toward the sensor portion;

each of the plurality of conductive elastic bodies is made of an electrically conductive rubber; and two sensor portions of the plurality of sensor portions are completely disposed in a smaller of two sectors defined by the operation center of the operation panel and two consecutive members to be pressed in a circumferential direction along the second circle.

* * * * *